(12) United States Patent
Davis et al.

(10) Patent No.: US 7,908,216 B1
(45) Date of Patent: Mar. 15, 2011

(54) INTERNET PAYMENT, AUTHENTICATION AND LOADING SYSTEM USING VIRTUAL SMART CARD

(75) Inventors: Virgil M. Davis, Los Altos, CA (US); Suzanne C. Cutino, San Francisco, CA (US); Margaret Reid, San Francisco, CA (US); Steve R. Hoffman, Pleasanton, CA (US)

(73) Assignee: Visa International Service Association, Foster City, CA (US)

( * ) Notice: Subject to any disclaimer, the term of this patent is extended or adjusted under 35 U.S.C. 154(b) by 431 days.

(21) Appl. No.: 09/359,083

(22) Filed: Jul. 22, 1999

(51) Int. Cl.
*G06Q 40/00* (2006.01)
(52) U.S. Cl. .......................................................... 705/41
(58) Field of Classification Search .................... 705/40, 705/41, 42, 43; 235/375, 376; 380/24; 335/378, 335/379, 380, 381, 382, 382.5
See application file for complete search history.

(56) References Cited

U.S. PATENT DOCUMENTS

| | | |
|---|---|---|
| 4,691,355 A | 9/1987 | Wirstrom et al. |
| 4,933,971 A | 6/1990 | Bestock et al. |
| 5,029,077 A | 7/1991 | Fatahalian et al. |
| 5,036,461 A | 7/1991 | Elliott et al. |
| 5,175,416 A | 12/1992 | Mansvelt et al. |
| 5,352,875 A | 10/1994 | Enomoto |
| 5,365,589 A | 11/1994 | Gutowitz |
| 5,373,561 A | 12/1994 | Haber et al. |

(Continued)

FOREIGN PATENT DOCUMENTS

EP 0 917 120 A 5/1999
(Continued)

OTHER PUBLICATIONS

Brian Santo, "Bill-paying put on line", Mar. 20, 1995, *Electronic Engineering Times*.

(Continued)

*Primary Examiner* — Susanna M Diaz
(74) *Attorney, Agent, or Firm* — Chadbourne & Parke LLP; Walter G. Hanchuk

(57) ABSTRACT

A system loads, authenticates and uses a virtual smart card for payment of goods and/or services purchased on-line over the Internet. An online purchase and load (OPAL) server includes a virtual smart card data base that has a record of information for each smart card that it represents for a user at the behest of an issuer. The server includes a smart card emulator that emulates a smart card by using the card data base and a hardware security module. The emulator interacts with a pseudo card reader module in the server that imitates a physical card reader. The server also includes a client code module that interacts with the pseudo card reader and a remote payment or load server. A pass-through client terminal presents a user interface and passes information between the OPAL server and a merchant server, and between the OPAL server and a bank server. The Internet provides the routing functionality between the client terminal and the various servers. A merchant advertises goods on a web site. A user uses the client terminal to purchase goods and/or services from the remote merchant server. The payment server processes, confirms and replies to the merchant server. The payment server is also used to authenticate the holder of a virtual card who wishes to redeem loyalty points from a merchant. To load value, the client terminal requests a load from a user account at the bank server. The load server processes, confirms and replies to the bank server.

24 Claims, 25 Drawing Sheets

U.S. PATENT DOCUMENTS

| | | | |
|---|---|---|---|
| 5,392,353 | A | 2/1995 | Morales |
| 5,396,558 | A * | 3/1995 | Ishiguro et al. ............... 380/30 |
| 5,416,842 | A | 5/1995 | Aziz |
| 5,440,633 | A | 8/1995 | Augustine et al. |
| 5,440,634 | A * | 8/1995 | Jones et al. ................ 235/379 |
| 5,455,863 | A | 10/1995 | Brown et al. |
| 5,497,421 | A | 3/1996 | Kaufman et al. |
| 5,517,569 | A | 5/1996 | Clark |
| 5,524,052 | A | 6/1996 | Augustine et al. |
| 5,544,086 | A | 8/1996 | Davis et al. |
| 5,548,106 | A | 8/1996 | Liang et al. |
| 5,559,887 | A | 9/1996 | Davis et al. |
| 5,633,930 | A | 5/1997 | Davis et al. |
| 5,649,118 | A | 7/1997 | Carlisle et al. |
| 5,665,951 | A | 9/1997 | Newman et al. |
| 5,673,418 | A | 9/1997 | Stonier et al. |
| 5,682,027 | A | 10/1997 | Bertina et al. |
| 5,706,442 | A | 1/1998 | Anderson et al. |
| 5,710,887 | A | 1/1998 | Chelliah et al. |
| 5,742,845 | A | 4/1998 | Wagner |
| 5,748,737 | A | 5/1998 | Daggar |
| 5,764,894 | A | 6/1998 | Boucher et al. |
| 5,790,677 | A | 8/1998 | Fox et al. |
| 5,854,891 | A * | 12/1998 | Postlewaite et al. .......... 713/202 |
| 5,883,810 | A | 3/1999 | Franklin et al. |
| 5,901,303 | A * | 5/1999 | Chew ............................ 235/492 |
| 5,914,471 | A * | 6/1999 | Van De Pavert ............. 235/375 |
| 5,917,168 | A * | 6/1999 | Nakamura et al. ............ 235/379 |
| 5,936,221 | A * | 8/1999 | Corder et al. ................. 235/379 |
| 5,963,924 | A | 10/1999 | Williams et al. |
| 5,969,316 | A | 10/1999 | Greer et al. |
| 5,996,076 | A | 11/1999 | Rowney et al. |
| 6,012,050 | A | 1/2000 | Eaton et al. |
| 6,016,484 | A | 1/2000 | Williams et al. |
| 6,032,135 | A | 2/2000 | Molano et al. |
| 6,072,870 | A | 6/2000 | Nguyen et al. |
| 6,105,008 | A | 8/2000 | Davis et al. |
| 6,119,946 | A | 9/2000 | Teicher |
| 6,163,772 | A | 12/2000 | Kramer et al. |
| 6,253,027 | B1 | 6/2001 | Weber et al. |
| 6,282,522 | B1 * | 8/2001 | Davis et al. ................... 235/375 |
| 6,422,459 | B1 * | 7/2002 | Kwan ............................ 235/380 |
| 6,434,238 | B1 * | 8/2002 | Chaum et al. ................... 380/45 |
| 6,516,357 | B1 * | 2/2003 | Hamann et al. .................... 710/2 |
| 2001/0008015 | A1 * | 7/2001 | Vu et al. ........................ 713/189 |

FOREIGN PATENT DOCUMENTS

| | | | |
|---|---|---|---|
| EP | | 0917120 | 5/1999 |
| EP | | 0936530 | * 8/1999 |
| EP | | 0982692 | * 8/1999 |
| WO | WO 94/28498 | | 12/1994 |
| WO | WO 96/04618 | | 2/1996 |
| WO | WO 96/13791 | | 5/1996 |
| WO | WO 96/38826 | | 5/1996 |
| WO | WO 96/32701 | | 10/1996 |
| WO | WO 96/38826 | | 12/1996 |
| WO | WO 96/41286 | | 12/1996 |
| WO | WO 97/10562 | | 3/1997 |
| WO | WO 98/25238 | | 12/1997 |
| WO | WO 98/43427 | | 1/1998 |
| WO | WO 98/19237 | | 5/1998 |
| WO | WO 98/25239 | | 6/1998 |
| WO | WO 98/19237 | | 7/1998 |
| WO | WO 98/43427 | | 10/1998 |
| WO | 98/49658 | | 11/1998 |
| WO | WO 98/49658 | | 11/1998 |
| WO | 99/10850 | | 3/1999 |
| WO | WO 99/10850 | | 3/1999 |
| WO | WO 00/04717 | | 1/2000 |
| WO | WO 00/25238 | | 4/2000 |
| WO | WO 98/25239 | | 4/2000 |
| WO | WO 00/25238 | | 5/2000 |
| WO | WO 01/08113 | | 1/2001 |
| WO | WO 01/08113 | | 2/2001 |
| WO | WO 01/09851 | | 2/2001 |
| WO | WO 01/09851 | | 8/2001 |
| WO | WO 01/76251 | | 10/2001 |

OTHER PUBLICATIONS

"Computer Dictionary", 3th.ed., Microsoft Press, 1997, p. 215.

Santo, Brian; "The NetBill Electronic Commerce Project"; Mar. 20, 1995; pp. 1-14; Electronic Engineering Times.

Special Issue; "To Probe Further", IEEE Spectrum; 1997.

Anderson, Howard; "Money and the Internet: A Strange New Relationship"; IEEE Spectrum; 1997.

Maat, Mike Ter; "The Economics of E-Cash"; IEEE Spectrum; 1997.

Berkeley, III, Alfred R.; "Nasdaq's Technology Floor: It's President Takes Stock"; IEEE Spectrum; 1997.

Wallman, Steven M.H.; "Technology Takes to Securities Trading"; IEEE Spectrum; 1997.

McChesney, Michael C.; "Banking in Cyberspace: An Investment in Itself" IEEE Spectrum; 1997.

Fancher, Hovenga Carol; "In Your Pocket Smartcards"; IEEE Spectrum; 1997.

Baldwin, Robert W. et al.; "Locking the E-Safe"; IEEE Spectrum; 1997.

Morris, Stanley E.; "Crime and Prevention: A Treasury Viewpoint"; IEEE Spectrum; Feb. 1997.

Kelley, Jr., Edward W.: "The Future of Electronic Money: A Regulartor's Perspective", IEEE Spectrum; Feb. 1997.

Gemmell, Peter S.; "Traceable E-Cash"; Sandia National Laboratories; IEEE Spectrum; Feb. 1997.

Chaum, David et al.; "Minting Electronic Cash"; IEEE Spectrum; Feb. 1997.

Sirbu, Marvin A.; "Electronic Payments-Credits and Debits on the Internet", Carnegie Mellon University, IEEE Spectrum; Feb. 1997.

Tekla, Perry S.; "Electronic Money: Toward a Virtual Wallet", IEEE Spectrum 1997.

Microsoft Press, "Computer Dictionary", Third Edition; 1997 p. 215.

* cited by examiner

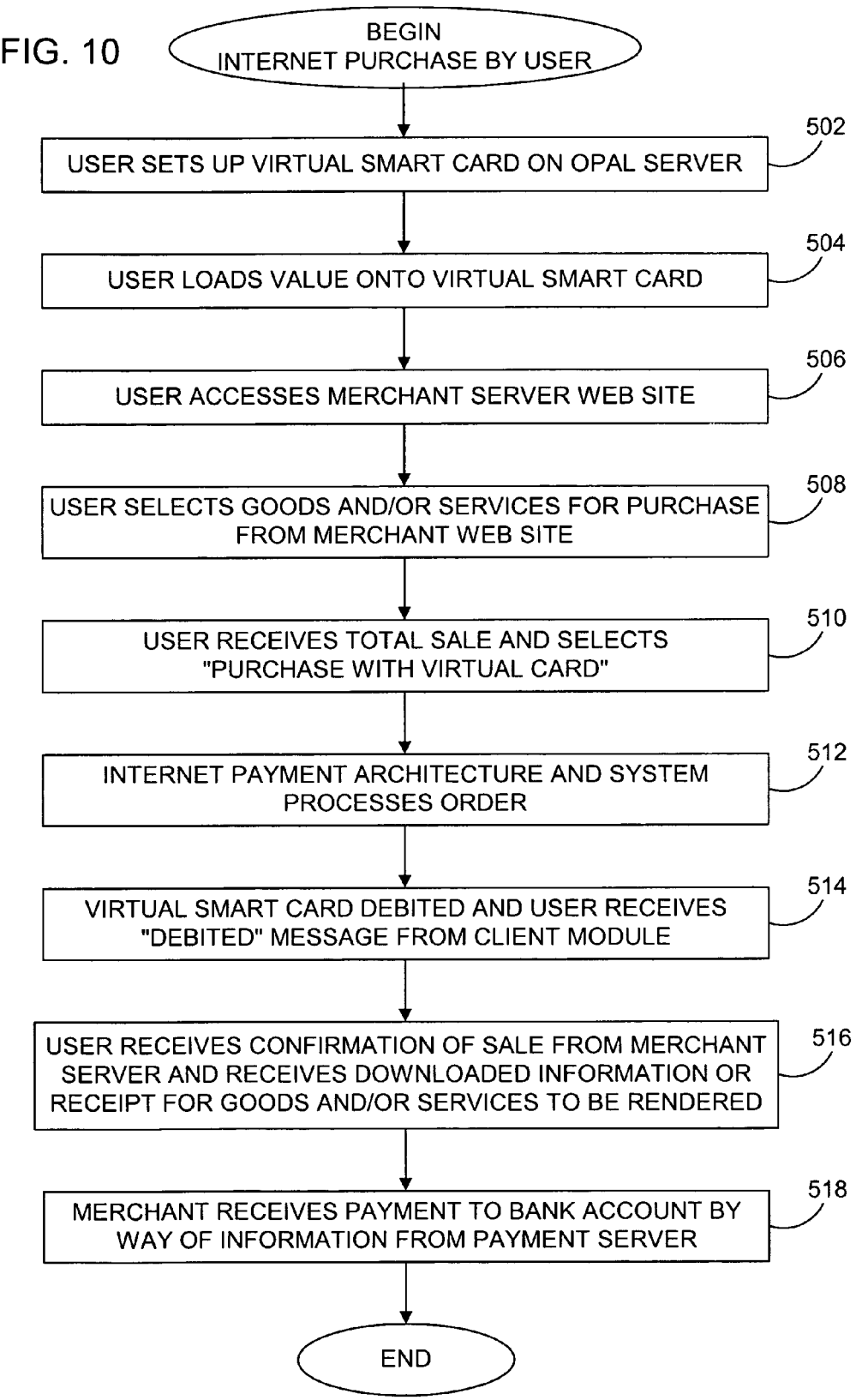

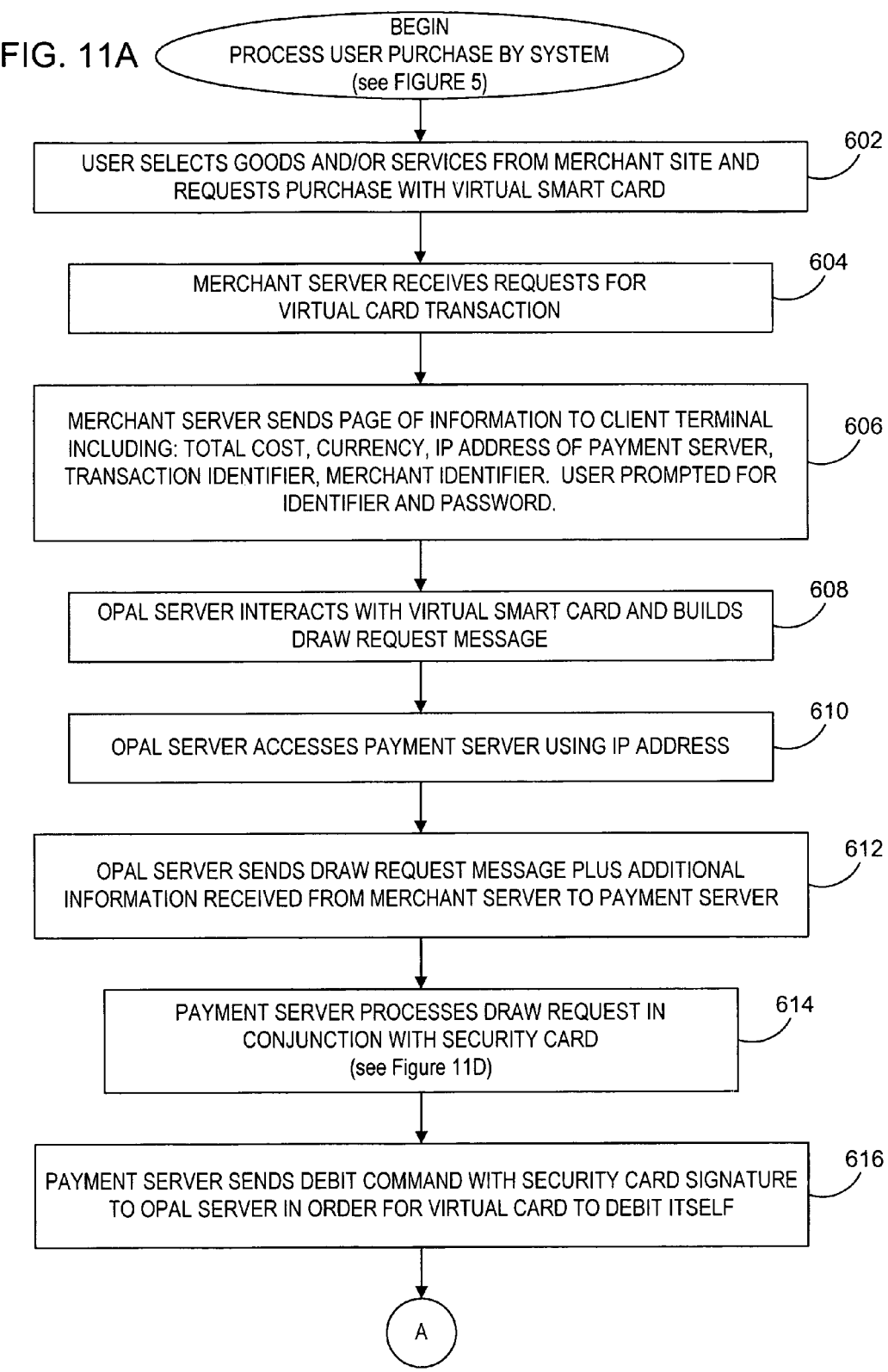

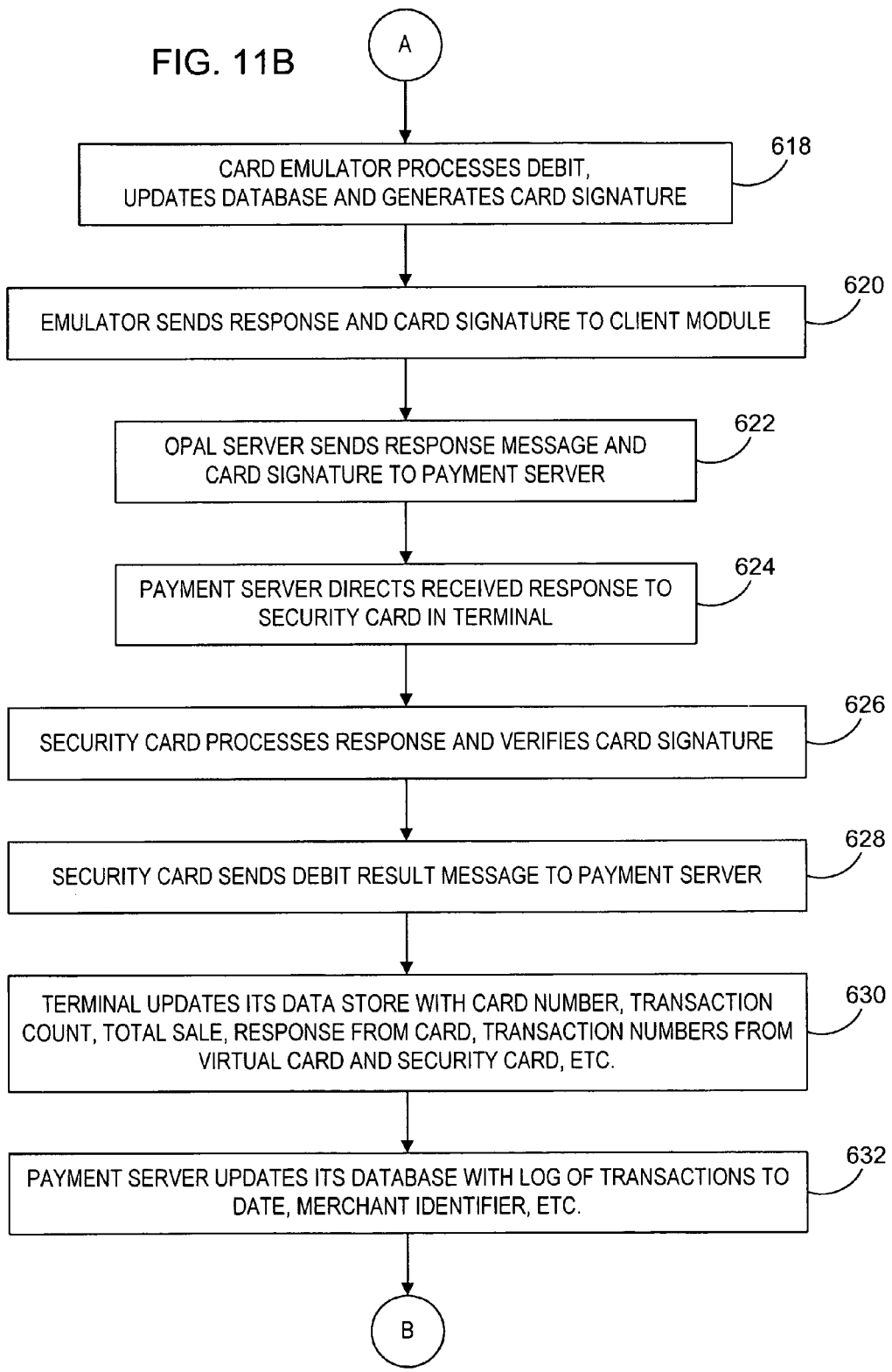

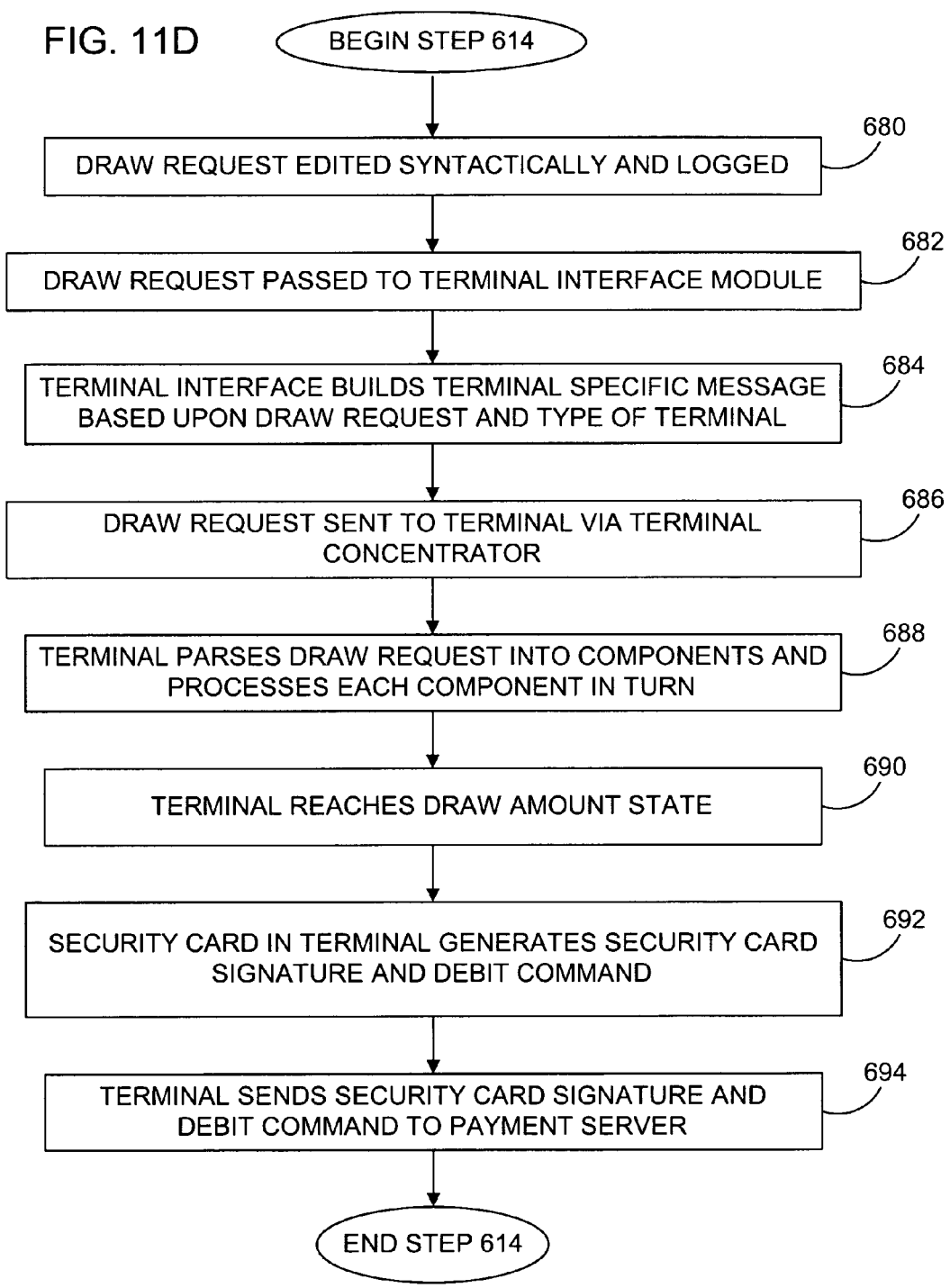

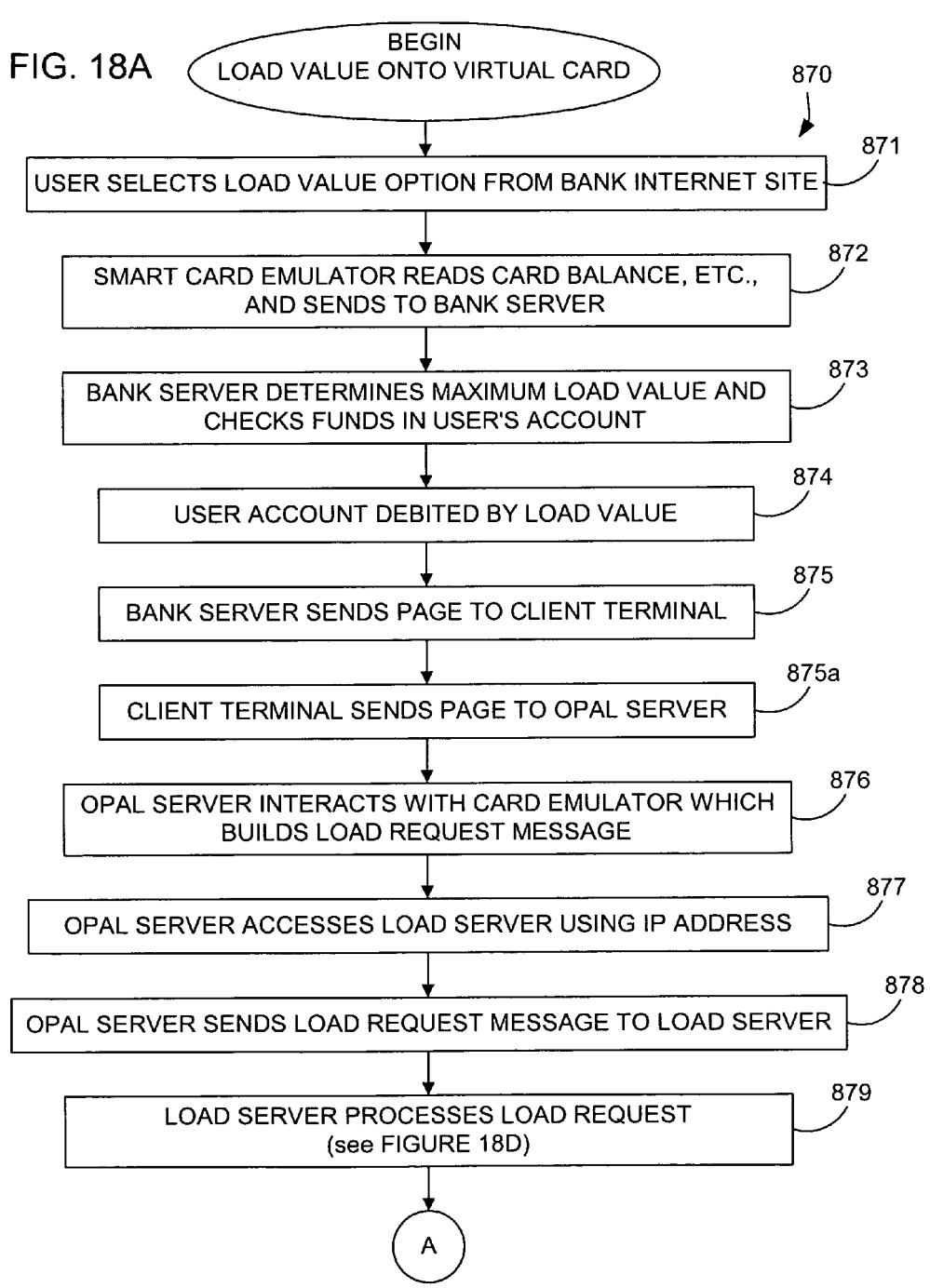

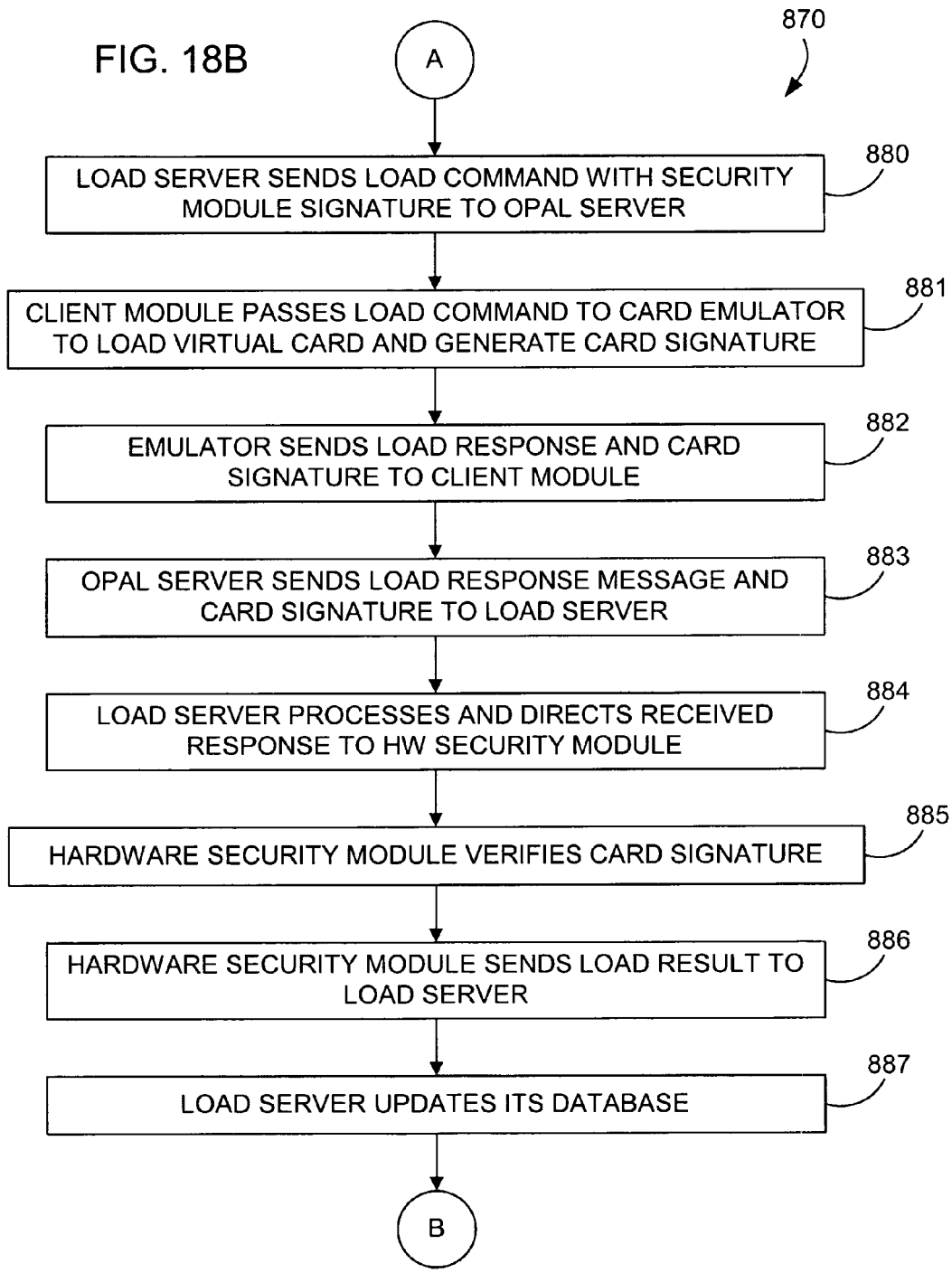

INTERNET PAYMENT, AUTHENTICATION AND LOADING SYSTEM USING VIRTUAL SMART CARD

FIELD OF THE INVENTION

The present invention relates generally to a payment and loading system using a computer network. More specifically, the present invention relates to a payment and loading system for a virtual smart card using an open network such as the Internet.

BACKGROUND OF THE INVENTION

With the explosive growth in the Internet over the past several years and the rapid increase in the number of consumers with access to the World Wide Web, there has been a great deal of interest in the development of electronic commerce on the Internet. Traditional financial transactions are being transformed. In particular, possibilities for the use of smart cards are expanding.

Also termed chip cards, integrated circuit cards, memory cards or processor cards, a smart card is typically a credit card-sized plastic card that includes one or more semiconductor integrated circuits. A smart card can interface with a point-of-sale terminal, an ATM, or with a card reader integrated with a computer, telephone, vending machine, or a variety of other devices. The smart card may be programmed with various types of functionality such as a stored-value application, a credit or debit application, a loyalty application, cardholder information, etc. Although a plastic card is currently the medium of choice for smart cards, it is contemplated that a smart card may also be implemented in a smaller form factor, for example, it may attach to a key chain or be as small as a chip module. A smart card may also be implemented as part of a personal digital assistant, telephone, or take a different form.

A smart card contains a hardware encryption module for performing a variety of encryption algorithms. Encryption may also be performed in software. *Applied Cryptography*, Bruce Schneier, John Wiley & Sons, Inc., 1996 discusses suitable encryption algorithms and is hereby incorporated by reference. Various mechanical and electrical characteristics of a smart card and aspects of its interaction with a card reader device are described in *Smart Card Handbook*, W. Rankl and W. Effing, John Wiley & Sons, Ltd., 1997, which is incorporated herein by reference.

One possible use of a smart card by a consumer is illustrated in FIG. 1. FIG. 1 illustrates an environment 100 useful for issuing smart cards and reconciling transactions performed with such a card. A terminal supplier 102 builds the equipment used by a service provider 104 to provide goods and/or services to consumers having a smart card at a service payment terminal 50. Card Supplier 106 contracts with an integrated circuit manufacturer and a card manufacturer for integrated circuits and plastic card bodies, then embeds the integrated circuits into the cards and initializes them with a serial number. It then delivers the cards to card issuer 108. In conjunction with clearing and administration system 110, card issuer 108 personalizes new cards and then transfers these cards to individuals (cardholders 112). The cardholder may then charge the card with value prior to use. Alternatively, the card may come with value already loaded. Cardholder 112 may then use the card at a service payment terminal 50 to purchase goods and/or services from service provider 104. Terminal 50 then debits the value from the card, thus creating a service payment. System 110 may be implemented using VisaNet, an existing global clearing and settlement system provided by Visa International Service Association of Foster City, Calif.

Periodically, all transactions are sent in a data file from terminal 50 via an acquirer 114 to clearing and administration system 110 along with accumulated service payment batches from other terminals. Based upon this collection data, clearing and administration system 110 then receives money from card issuer 108 that had originally come from cardholder 112. Clearing and administration system 110 then transfers a lump sum to acquirer 114 using a suitable settlement service (such as one provided by Visa International) to pay the various service providers having a relationship with acquirer 114. Based upon the previous collection data, acquirer 114 then transfers an appropriate amount of money to each service provider 104 reflecting the value of the goods and/or services that that service provider had provided that day to cardholders based upon deductions from their smart cards.

A consumer typically uses such a service payment terminal 50 in a face-to-face environment in order to purchase goods in a store or directly from the terminal itself. Service payment terminal 50 can be an attended device or it can be integrated into a self-service device such as a vending machine or public telephone. For example, the service payment terminal may be incorporated into a soda machine in order to dispense sodas to a customer in which the customer pays by inserting the smart card. Or, the service payment terminal may be a point-of-sale terminal such as is found at a check-out counter where a consumer inserts his smart card in order to purchase goods.

Such a service payment terminal 50 allows a consumer to use a smart card for the payment of goods and/or services, generates a payment result from a transaction, and bundles individual payment results into a collection for transfer to a clearing and administration system, which then transfers funds that had been debited from a consumer's smart card to the merchant whose goods and/or services had been purchased from the terminal.

Thus as described above, a variety of goods or services may be purchased using a smart card from a merchant having a service payment terminal on the premises. In addition, a consumer with a smart card may purchase goods or services from a merchant over the Internet using a technique such as described in U.S. patent application Ser. No. 08/951,614 by Davis et al., filed Oct. 16, 1997, entitled "Internet Payment Using Smart Card" which is incorporated by reference.

In order to purchase something, however, the card must be loaded with value first. Value can be loaded onto a stored-value card in a variety of ways. It may be inconvenient for a consumer to load value onto his or her smart card. A consumer must physically travel to a bank or other institution that has an automated teller machine (ATM) or other similar device in order to load value on to his or her smart card. The consumer can insert money into the machine and have a corresponding value put onto the smart card, the consumer can use a debit card to deduct value from the consumer's account at the bank for transfer to the card, or a credit card can be used as the source of funds to be transferred to the smart card. In either case, the consumer must travel to the bank to load value. Further creating difficulty is that not all banks or other financial institutions have such a machine for loading value onto a consumer's smart card.

A technique to allow a user to conveniently and easily load value onto a smart card over the Internet is described in U.S. patent application Ser. No. 09/070,488 by Davis et al., filed Apr. 30, 1998, entitled "Internet Loading System Using Smart Card" which is incorporated by reference. It is desirable in some situations, however, to be able to use such payment and loading systems without having a physical smart card.

The successful development of such systems described above is somewhat dependent on the deployment of two hardware components new to the mass consumer market: smart cards and smart card readers (either stand alone or integrated with some form of personal electronic device such as a mobile telephone or computer keyboard). Both represent relatively new technology which raises the issues of reliability, cost, market acceptance and distribution. Although the above-described systems could technically be implemented, the lack of a large number of smart cards and card readers in public use raises certain infrastructure difficulties.

As mentioned above, the above-described systems have many benefits for electronic commerce. As cash may not be an option in many situations, the above systems offer a compelling solution for merchants selling products or services on-line that in the physical world might have low monetary value. The deployment of such systems, however, is hampered by lack of smart cards and smart card readers. This problem is further exasperated by the fact that the card reader market is not well developed from a standards perspective raising the potential for significant interoperability issues. Simply put, a practical problem exists in that without large numbers of smart cards and card readers in use, there is no great demand from consumers, and hence it is more difficult to convince merchants to use such systems.

Therefore, it would be desirable to have a technique that would quickly and easily allow consumers and merchants to use the above-described system, but without the need for physical smart cards and smart card readers to be distributed and installed. Such a technique would provide a fast, inexpensive alternative for users of the above-described systems to address the electronic market opportunity. Such a technique would also allow merchants and issuers to establish a market presence that would facilitate the acceptance of smart cards and card readers when those hardware components become more readily available.

SUMMARY OF THE INVENTION

To achieve the foregoing, and in accordance with the purpose of the present invention, an online purchase and load (OPAL) server is disclosed that implements virtual smart cards. The present invention complements the above-described Internet payment and loading systems by providing software emulation of smart cards and smart card readers. Advantageously, other components of the Internet payment and loading systems (such as the merchant server and payment server) and the techniques for processing payment and load transactions may remain the same. Use of the OPAL server will be transparent to merchants on the Internet. In one embodiment, a smart card and its associated card reader are emulated on a remotely-located OPAL server computer, thus obviating the need for physical smart cards and smart card readers. The existing client terminal acts as a pass-through device that is transparent to a user, a merchant server or a bank server.

This enhancement to Internet payment and loading systems provides many advantages. For example, the present invention accelerates the adoption of the systems in electronic markets by circumventing the cost and distribution issues associated with physical cards and card readers. When infrastructure to support physical smart cards and card readers is developed, the present invention can be replaced using the hardware approach and/or be used in conjunction with the actual hardware. The enhanced system of the present invention also provides a mechanism to address the low value (less then $10.00) electronic commerce market in a rapid manner using an infrastructure that is easily scaleable. By remaining integrated with the hardware-based approach, the present invention provided the means to accelerate development of the previously described Internet payment and loading systems and to create a base of consumers that may be converted to the hardware approach when the required hardware is more widely available.

Furthermore, the present invention is secure in that the cryptographic functions normally performed within a smart card are performed securely within the remote OPAL server that may be under the control of an issuing bank or a trusted third party. A further advantage of the present invention is that value may be credited to a consumer's account (i.e., the virtual smart card that is being emulated) quickly and easily by the OPAL server internally. A special load server is not necessarily required, but may be used.

In addition to the above advantages of an OPAL server, use of a virtual smart card is extremely advantageous for small dollar amount transactions. Often, consumers are reluctant to use, and merchants are reluctant to accept, credit card transactions for small dollar amounts. For the consumer and the merchant dealing with many of these small transactions can be a bookkeeping headache and may not be worth the expense. A merchant may also be unlikely to accept a credit card for a small dollar amount transaction because of the service fees per transaction. By permitting the use of a virtual card to make purchases over the Internet for small dollar amounts, a merchant may very well be able to begin charging for goods and/or services that he had been providing for free in the past. The invention works well with purchases of under about $10.00, although purchases of any amount may be made. A merchant is also provided a method to recover costs of services not previously charged for, and is provided immediate access to an existing, and rapidly growing, consumer base. Furthermore, the present invention integrates into an existing clearing and settlement system meaning that the merchant need not implement nor become familiar with new procedures for reconciliation of transactions.

Furthermore, a merchant need only make a minimal investment in time and money to take advantage of the present invention and to accept payments over the Internet. The merchant need not engage in the development of complex software or accounting procedures. Thus, smaller merchants will especially benefit from the present invention. By establishing a business relationship with an acquirer and incorporating standard merchant software, a merchant is ready to begin selling goods and/or services from his web site. Because a virtual smart card with a stored-value application is used, the payment server and the OPAL server perform the details of and provide security for the transaction and a merchant is relieved from having to control and keep track of a transaction. From a merchant's point of view, the merchant knows that a consumer desires to purchase an item and that a cost has been transmitted to the consumer, thus, when the merchant receives a confirmation message, the merchant may release the item to the consumer. The merchant need not be concerned about security nor be responsible for authenticating a card nor for determining a balance on the card.

In an authentication embodiment, a consumer may wish to access any of a variety of Web servers in order to redeem frequent flyer miles, award points, etc., that he or she has accumulated as part of a loyalty program. In this embodiment, a consumer has accumulated points through any of a variety of programs with airlines, restaurants, rental car companies, hotels, banks, credit or debit card issuers, telephone or other communication company, etc. Often the consumer wishes to redeem these points to receive free airline tickets, meals, car rental, overnight stays, prizes, awards, discounts, or other benefits. It is important to the airline (or other company) to be able to authenticate that the person trying to redeem points is the actual person who owns the points. By accessing a Web server associated with the particular program, this embodiment of the invention allows the consumer to use a virtual card in the OPAL server to authenticate that he or she is the true owner of the points and to receive benefits from the program.

In another embodiment of the present invention, a loading technique allows the consumer to conveniently load value on to his or her virtual card from any suitable device via an open network such as the Internet. A consumer is allowed to use any suitable computer at the home, office or elsewhere in order to connect to his bank or other financial institution. Using appropriate message integrity, value is transferred from the bank to the consumer's virtual card. At the same time, the corresponding value is transferred from the bank to the virtual card issuer through existing networks for later settlement with a merchant from whom the consumer purchases goods or services. Advantageously, this embodiment makes use of an existing clearing and settlement system for eventual settlement of the transaction between the merchant and the card issuer. Thus, a consumer may conveniently load value on to his or her virtual card while a high level of security is maintained.

From the consumer's perspective, this loading embodiment operates in a fashion similar to loading a physical card at an ATM machine, except that the consumer need not insert cash or an additional debit or credit card, nor need travel to a bank. The loading functionality is distributed across the Internet between the OPAL server, a bank server holding the consumer's account, and a load server with a security module. All of these entities may be physically remote from one another with router functionality being provided by the Internet.

To complement the above embodiments, an existing clearing and settlement system is used to reconcile the transaction and to pay the appropriate parties once the value has been spent. Advantageously, a new system and methodology for reconciling transactions need not be developed or implemented. The pre-existing clearing and settlement system is used which greatly simplifies implementation of the present invention. A participating bank need not implement or become familiar with new procedures for reconciliation of transactions.

BRIEF DESCRIPTION OF THE DRAWINGS

The invention, together with further advantages thereof, may best be understood by reference to the following description taken in conjunction with the accompanying drawings in which:

FIG. 10 is a flowchart describing a user's perspective of a virtual card purchase transaction using the present invention.

FIGS. 11A-11D are a flowchart describing the processing of a user purchase using an embodiment of the present invention.

FIGS. 18A-18D are a flowchart describing the loading of a user's virtual card using an embodiment of the invention.

DETAILED DESCRIPTION OF THE INVENTION

Figure 2:
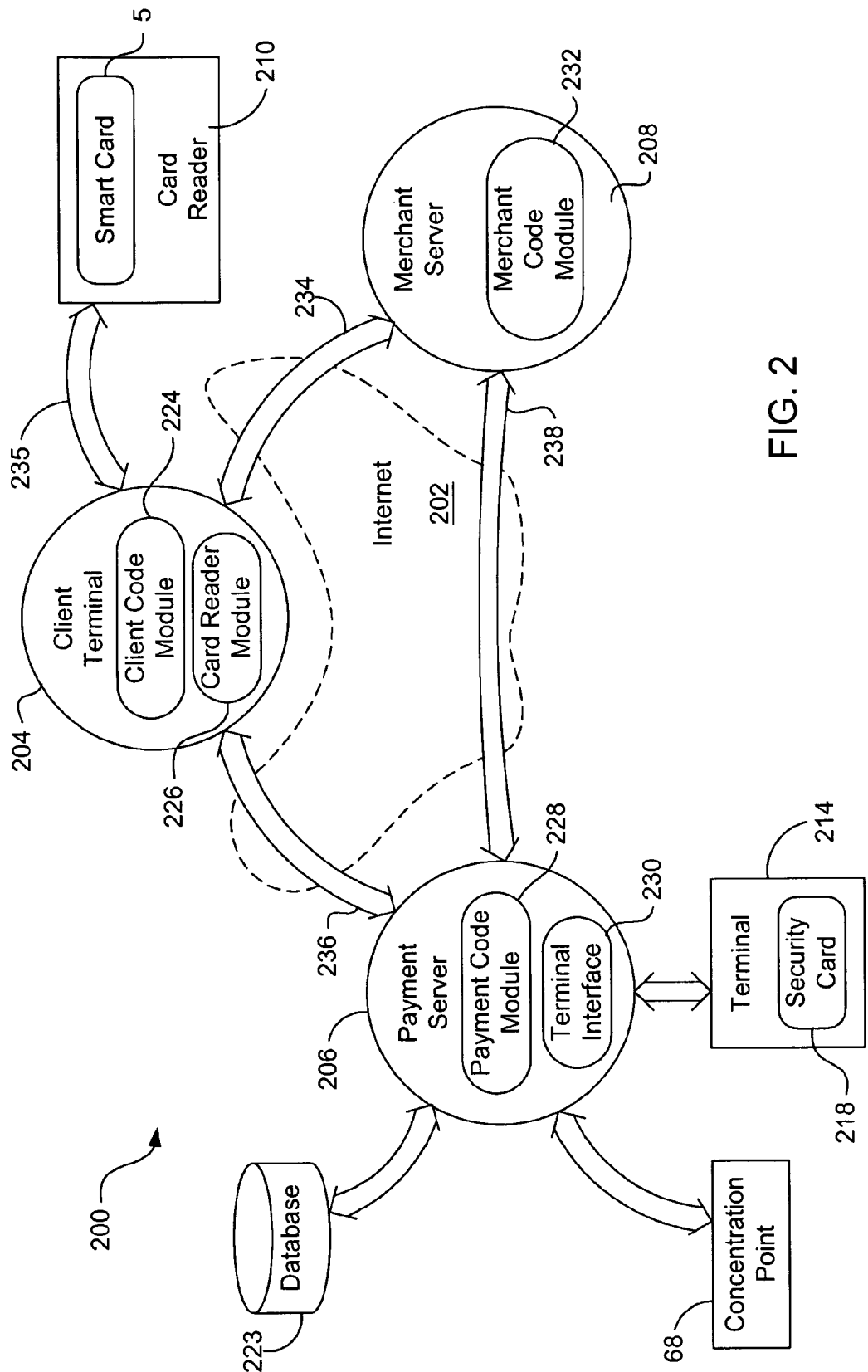
FIG. 2 illustrates a system for payment over the Internet using a smart card.

FIG. 2 illustrates symbolically an internet payment system 200 using a smart card that is in accordance with U.S. patent application Ser. No. 08/951,614 referenced above; such a system serves as a background for an introduction to the present invention of FIG. 3.

Transaction with Physical Smart Card

Shown is Internet 202, a client terminal 204, a payment server 206 and a merchant server 208. Local cardholder functions including a consumer card interface, display and accept/cancel options are performed at client terminal 204. Payment functions including security card control, data store and use of a concentration point are performed by payment server 206. The presentation and eventual delivery of goods and/or services by a merchant are performed under control of merchant server 208. Internet 202 performs routing functions between each entity. It should be appreciated that Internet 202 may take the form of the Internet currently in use, or may also be any other open network implemented using any combination of computer, telephone, microwave, satellite, and/or cable networks.

Basically, client terminal 204 controls the interaction with a consumer and interfaces to card reader 210 which accepts a smart card having a stored-value application. Payment server 206 communicates directly with a terminal 214 or through a concentrator that handles any number of terminals each having a security card 218. Payment server 206 also communicates with concentration point 68 for transmission of transaction data to a clearing and settlement system. Database 223 stores all suitable information passing through payment server 206 for each transaction. Use of such a database allows any number of merchants (or merchant servers) to use payment server 206 for transactions. Payment server 206 controls payment functions such as handling the attached terminals, managing database 223 and collection functions. Merchant server 208 is a site that has contracted with an acquirer to accept smart card transactions as payments for goods and/or services purchased over the Internet.

Smart card 5 may take a variety of forms and is useful in many situations where it is desirable to store monetary value on a card that a consumer may use. In general, smart card 5 is any card or similar device able to store a value that is decremented when the card is used. The card may be purchased complete with a stored-value or value may later be added to the card by a consumer. Such cards may also have their value replenished.

Smart card 5 may also perform a variety of functions in addition to simply storing value. Such a card may serve debit, credit, prepayment, and other functions. Such a card typically includes information such as a bank identifier number, a sequence number, a purchase key, a load key, an update key, an expiration date, a transaction counter, etc., in addition to a running balance.

Smart card 5 may include an encryption module in order to provide a variety of security precautions. By way of example, security precautions may include simple PIN numbers, biometrics, simple algorithms, or sophisticated algorithms such as the Data Encryption Standard (DES) or Rivest, Shamir, Adelman (RSA) encryption. The card is thus able to use these precautions to verify consumers, card readers, etc., to validate security cards and/or to provide a unique signature. Preferably card 5 includes any number of keys known to the card issuer that are used during the course of a payment or load transaction to generate signatures for validation of the stored-value card, validation of the security card or module, and validation of the system itself.

Client terminal 204 is any suitable device for interacting with card 5 and for communicating over a network to a payment server and a merchant server. By way of example, client terminal 204 may be a mainframe computer, a work station, a personal computer, a set top box, a kiosk, or any type of service payment terminal that a consumer might use to purchase goods and/or services. Furthermore, client terminal 204 may also be embodied in any portable device such as a laptop computer, a cellular telephone (including GSM telephones), or any variety of a personal digital assistant (PDA). Card reader 210 is any suitable interface device that functions to transfer information and commands between client terminal 204 and card 5.

Client terminal 204 includes client code module 224 and card reader module 226. Reader module 226 may be implemented using any suitable software and libraries for communicating with card reader 210 and its actual implementation will depend upon the type of card reader used. Client module 224 controls communication between the client terminal, the card reader, the payment server and the merchant server. Client module 224 may be implemented using any suitable code. In one embodiment of the invention, client module 224 is implemented using a combination of "C" code and a Java applet. The applet is also supplemented with parameters from an HTML page sent from the merchant server. It is contemplated that Java code works well for implementing the modules on the client, payment and merchant servers because it is platform independent, and could even replace the "C" and "C++" code used.

Client module 224 is also responsible for controlling displays to the consumer and for the interaction between the card and the card reader. The module also builds the draw request message after receiving all of the start-up information from the card and the amount of the purchase from the merchant server.

Payment server 206 includes payment code module 228 and terminal interface 230. As with client terminal 204, payment server 206 may be implemented using any suitable computer. By way of example, a personal computer works well. There may be one payment server for each merchant server or a single payment server may service any number of merchant servers. Alternatively, there may be multiple payment servers for a single merchant. In addition, payment server 206 need not be remote from merchant server 208 but may be located at the same site and have a different Internet address, or the payment server and the merchant server may even be implemented on the same computer. Payment server 206 is designed to facilitate the communication between the consumer's smart card and a terminal's security card.

Payment module 228 may be implemented using any suitable code. By way of example, payment module 228 is implemented using a combination of "C" code, "C++" code and Java code. Payment module 228 is, in one specific embodiment, a multi-threaded process that can service multiple concurrent client applet transactions on demand. The module is responsible for controlling all interactions with terminal 214 including the transaction collection function. For individual transactions, payment module 228 controls the message flows and logs interim results. When an applet connects with payment server 206, it creates a transaction thread to support the transaction through its life cycle. Each thread, in turn, assigns a terminal for communication. Having a one-to-one correspondence between transaction threads and terminals has been found to provide desirable results.

Terminal interface 230 is any suitable set of software and libraries for communicating with a terminal 214 either directly or through a terminal concentrator. The actual implementation of terminal interface 230 will depend upon the type of terminal used. A terminal such as 214 may be any suitable terminal such as are known in the art. By way of example, an iq Delta 2010 terminal made by Schlumberger has been found to provide desirable results. Such a terminal supports a variety of commands originating from the terminal interface. These commands emulate the normal responses from a smart card to a security card should both be located in the same service payment terminal. The actual security card commands are held in the terminal while the terminal performs the tasks necessary to simulate the presence of a smart card. Alternatively, the emulation of the card commands can be done by the payment server using the terminal as a card reader, or may even be performed by client terminal 204.

Security card 218 is any suitable security card such as are known in the art (often referred to as a Purchase Secure Application Module—PSAM). In other embodiments, the functionality of security card 218 can be replaced by a hardware security module (HSM), could be implemented in hardware within the payment server, or could even be implemented in software.

By way of example, security card 218 is a removable credit card-sized smart card that is programmed to process and store data relating to financial transactions. Security card 218 contains a microchip embedded in the card that enables the card to authenticate and to validate the consumer's smart card. If a consumer's smart card is accepted by the security card, and the smart card contains sufficient value, the security card guarantees that the merchant providing goods and/or services will receive payment according to the amount deducted from the smart card. In a preferred embodiment, the security card also contains DES and public key purchase security keys and authenticates the smart card during a purchase transaction and secures the payment and collection totals. A security card also stores signature algorithms for all smart cards in use. A security card may also contain a transaction identifier for the current transaction, a financial sum of all transactions remaining to be settled, a session key, and master keys for all smart cards in use. Further, the security card may contain generations of keys, blocked card indicators, date of last update, multiple card programs, different currency rates and additional security.

Concentration point 68 is a staging computer that communicates with a payment server to collect batches of purchase transactions. The concentration point then sends these transaction batches to a clearing and settlement system for processing. Once processed, batch acknowledgments, along with other system updates, are sent back.

Merchant server 208 includes a merchant code module 232. Merchant server 208 may be implemented upon any suitable computer capable of communicating with and presenting information to consumers over the Internet. Merchant code module 232 may be implemented using any suitable code. By way of example, merchant module 232 may be implemented using a combination of Perl, HTML, and Java code. Merchant server 208 is typically a generic web server customized for the merchant's business. Merchant server 208 may include databases, CGI scripts and back-office programs that produce HTML pages for an Internet user.

A brief discussion of the flow of a transaction now follows. During a financial transaction, client terminal 204 and merchant server 208 exchange information 234 via Internet 202. Each transaction initiated by a consumer has a transaction identifier created at the merchant server; a merchant identifier unique to the payment server is also available from the merchant server. Client module 224 and the payment server also use this unique transaction identifier for tracking and logging information about the transaction. Merchant server 208 generates a unique identification of the transaction, completes other required parameters, encrypts as appropriate, and builds an HTML page and sends it to the client terminal. Client code module 224 interacts (235) with smart card 5 and builds a draw request message containing related card information, the purchase amount, and other information supplied by the merchant server.

Client terminal 204 then communicates (236) with payment server 206 by first forwarding the draw request to the payment server. Payment server 206 verifies the transaction to determine if it is a valid transaction from a known merchant. The transaction is logged into the payment server's transaction database 223. Upon completion of a transaction, payment server 206 builds a result message containing the identification of the transaction and signs it. The message is then routed to merchant server 208 via client terminal 204. Merchant server 208 then validates the result message. After determining that the transaction was successful, merchant server 208 creates an HTML page for the purchased information and sends it to client terminal 204. Alternatively, the merchant may also deliver purchased goods to the consumer at this point. It is also possible for the payment server and the merchant server to communicate information (238) directly between themselves. Preferably, as client terminal 204 has already established communication with the merchant server and the payment server, links 234 and 236 are used to exchange information between the payment server and the merchant server, rather than establishing a new link 238.

Transaction with Virtual Smart Card

Figure 3:
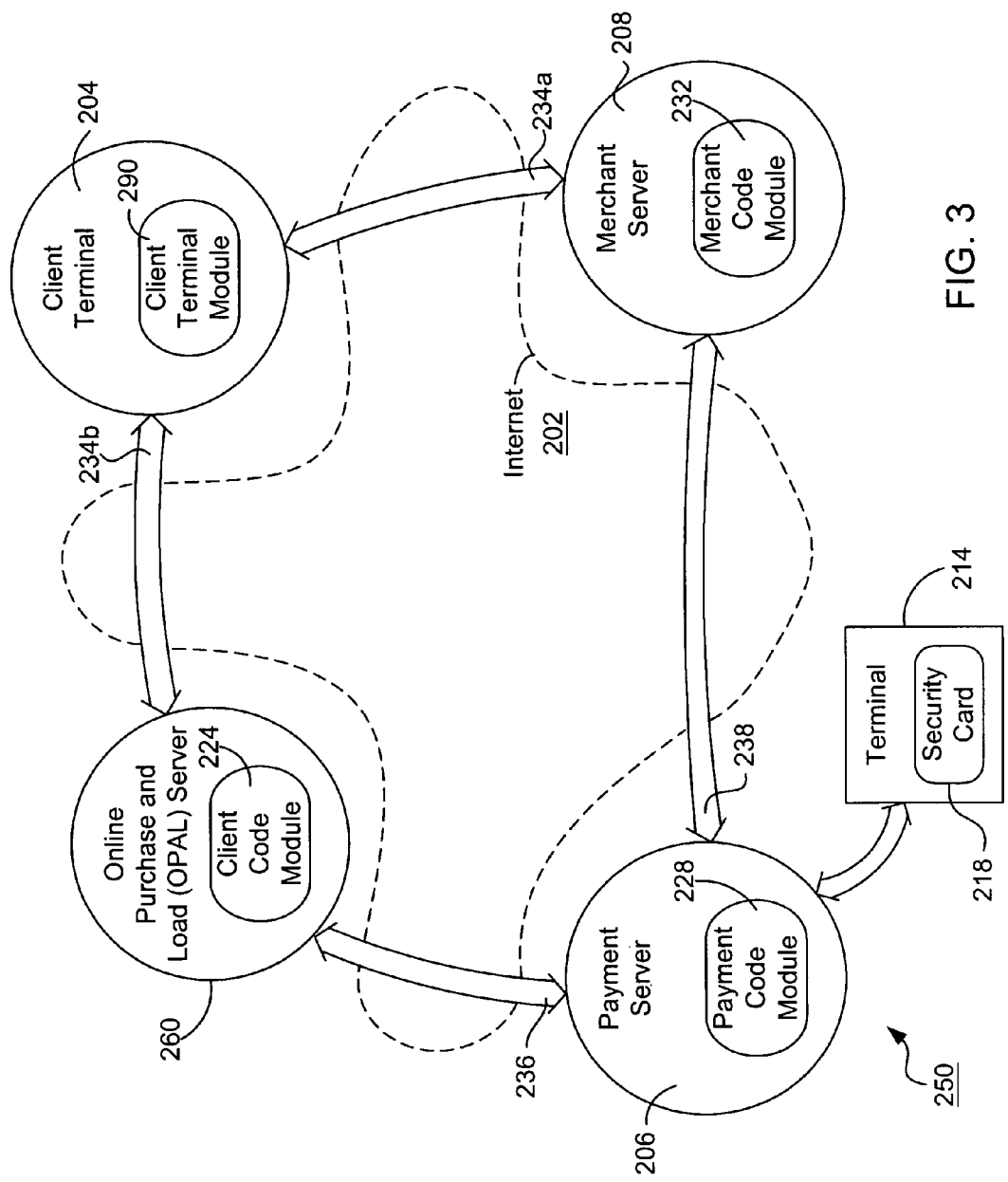
FIG. 3 illustrates a system for payment over the Internet using a virtual smart card according to an embodiment of the invention.

FIG. 3 illustrates an Internet payment and loading system 250 according to one embodiment of the present invention. Similar to FIG. 2, system 250 includes client terminal 204, payment server 206 and merchant server 208. System 250 dispenses with the need for card reader 210 and smart card 5; their functionality now being contained within on-line purchase and load (OPAL) server 260.

Client code module 224 is now functionally part of OPAL server 260 instead of being part of client terminal 204. Further, the functionality of card reader module 226 of FIG. 2 is now included within client code module 224 to allow communication with pseudo card reader module 264. Also, the user interface functionality of client code module 224 is transferred to a client terminal module 290 of client terminal 204. In this embodiment, pass-through client module 290 serves to "pass through" communications between merchant server 208 and OPAL server 260. As such, communications 234 of FIG. 2 are split into communications 234*a* and 234*b*.

OPAL server 260 effectively replaces the need for a physical smart card and physical card reader within system 250. To achieve this goal, OPAL server 260 implements a pseudo card reader module 264 and smart card emulator 266 in software (as described in more detail below in FIG. 4). A card database 270 stores information representing "virtual" smart cards in use within the system. Card emulator 266 interacts with card database 270 and a hardware security module (HSM) 268 to effectively replace the physical smart card and reader. Thus, client code module 224 may be implemented as before and be unaware that it is interacting with a software emulation of a smart card rather then with a physical smart card.

OPAL server 260 stores the same data used in the physical cards in its database and handles incoming commands from load or payment servers to increment or decrement a "card" balance as appropriate. Important data is stored in encrypted form and all functions that require a change to important data or the generation or checking of signatures is performed in HSM 268. Preferably, OPAL server 260 resides at an issuer's site or at its designated processor. It is contemplated that one such server may support multiple issuers provided appropriate safeguards are in place to partition data.

In an alternative embodiment, client terminal 204 does also include a card reader 210 and a smart card 5. In this embodiment, included in client terminal 204 is also client code module 224 in addition to pass-through client module 270. In this alternative embodiment, system 250 may operate in either of two modes. According to the present invention, the system may operate without using a physical smart card by using the emulation contained within OPAL server 260. Concurrently, or at a later date when smart cards and readers are more common, system 250 is then easily upgradeable to make use of the physical card and reader attached to client terminal 204.

Figure 4:
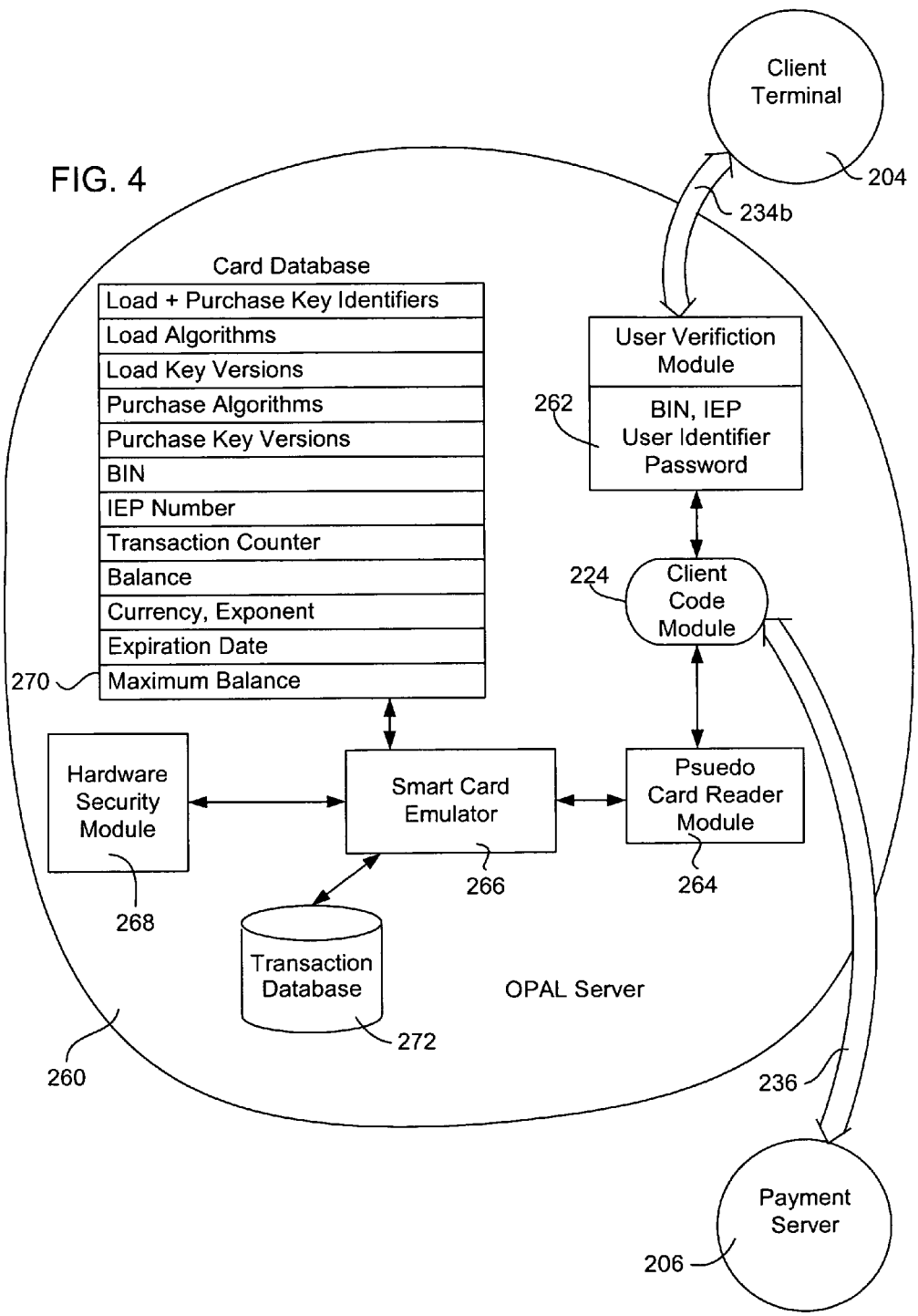
FIG. 4 illustrates in greater detail the online purchase and load (OPAL) server of FIG. 3.

FIG. 4 illustrates OPAL server 260 of FIG. 3 in greater detail. OPAL server 260 communicates with client terminal 204 through user verification module 262 and with payment server 206 over link 236. OPAL server 260 emulates a physical smart card through the use of pseudo card reader module 264, smart card emulator 266, hardware security module (HSM) 268 and card data base 270.

Card database 270 is a database implemented in any suitable format and contains a record of information for each virtual smart card in use within the system. Preferably, card database 270 includes the information shown for each virtual smart card in use and thus helps to simulate a physical smart card. Preferably, an identifier such as a user name, password or some combination is used as an index into database 270 in order to identify the appropriate virtual card for loading, debiting or authentication. Also, it is preferable that the information contained in the database is stored in an encrypted form for security. In one embodiment, the database is implemented in Sybase.

Each record in database 270 stores a variety of information for a virtual smart card: load and purchase keys identifiers, card and issuer certificates, load algorithms, load key versions, purchase algorithms, purchase key versions, a bank identification number (BIN), an IEP number, a transaction counter, a balance, a currency and exponent, an expiration date and a maximum balance. Load and purchase key identifiers indicate which keys should be used. Although all keys may be stored within HSM 268, in one embodiment the keys are stored within database 270 as well, with the exception of the HSM master key which is stored in HSM 268.

Load algorithms are identifiers that identify which cryptographic algorithm of HSM 268 is to be used for the verification and generation of signatures S1, S2, and S3 during a load. Load key version is an identifier identifying which version of a key shall be used for the generation or verification of a particular load signature. Purchase algorithms and purchase key versions perform a similar function during a purchase.

A six-digit BIN in combination with the ten-digit IEP forms a sixteen-digit identification number that uniquely identifies a particular virtual smart card. This identification number is also known as an OPAL card identifier. Preferably, each BIN, or card range, has a single maximum balance and currency for all of its virtual cards. A transaction counter counts all the transactions for a particular smart card. The balance keeps track of the value for the particular card; currency and exponent information provide further details on the balance. Expiration date provides an expiration date for the card. The maximum balance provides a maximum for the virtual card, or could also indicate a maximum balance for all virtual cards associated with a BIN.

Hardware security module (HSM) 268 is used to facilitate cryptographic processing. HSM 268 typically stores secret keys and encryption algorithms, performs cryptographic functions on secret data and generates signatures. As is known in the art, HSM 268 is generally a tamper-proof device which uses some level of physical security measures to protect the sensitive information inside. HSM 268 may be any security module used in the industry, such as a RACAL HSM Model RG7000, or similar to the security box attached to automatic teller machines. In alternative embodiments, HSM 268 may be implemented on a smart card within a card reader, on a series of smart cards, may be implemented on any suitably secure computer, or may be implemented in software.

HSM 268 performs the role of an encryption module of a physical smart card in addition to other tasks. In a physical smart card, various data elements such as balance and currency are contained securely within the smart card. In the embodiment shown, however, such data elements are not stored within HSM 268 but are stored on server 260 in card data base 270. For such important information, preferably these data elements are stored in an encrypted form in database 270. Thus, HSM 268 performs the additional task of receiving encrypted card data (such as transaction counter, balance, etc.) from data base 270 via emulator 266, decrypting the card data, performing any cryptographic functions upon the data, and then encrypting the data and sending it back out to be stored in card data base 270. For example, if the card balance is to be reduced, the encrypted balance is sent from data base 270 to HSM 268 where is decrypted, reduced, and then finally encrypted again before it is returned to data base 270.

HSM 268 also performs cryptograph functions related to signatures used within the system, such as signatures S1, S2 and S3. Signature S1 is used during a load operation and typically is generated by the smart card. Signature S2 is used during a load or purchase operation and is generated by the issuer or a payment server. Signature S3 is generated by the smart card on occurrence of a load or debit and is the final signature after the card has either loaded value onto, or debited value from, itself. In the present invention, HSM 268 performs these functions that are normally handled by a smart card because no physical smart card is present. HSM 268 is used to generate signatures S1 and S3 and verify signature S2 for a load operation, and is used to verify signature S2 and generate S3 for a purchase operation. HSM 268 may also perform other cryptographic functions that would normally be performed by a physical smart card.

Transaction database 272 records information regarding transactions that occur such as a debit or a load, and may be implemented in a similar fashion as database 223. Also known as a history database, database 272 includes a purchase table (log full transactions and timestamps) and a load table (log full transactions, funding request/response and timestamps).

Pseudo card reader module 264 is a software module that performs the functionality of a physical card reader so that emulation of a smart card is transparent to client code module 224. Card reader module 264 accepts actual card reader commands from client code module 224 and, instead of using them to drive a physical card reader, places them into a format to communicate with smart card emulator 266 that is emulating a smart card. Thus, an existing application programming interface (API) used by client code module 224 to communicate with a smart card may continue to be used. In an alternative embodiment, card reader module 264 and emulator 266 may be collapsed into a single function block although this may require modification of the commands issued by client code module 224.

User verification module 262 allows OPAL server 260 to identify which user is logged on to the system and is desiring to access a virtual card in card database 270. Preferably, module 262 provides a login procedure that requires a secret user identifier and password from each user. A combination of this user identifier and password is then used as an index into card database 270 to identify the record that represents the virtual smart card for that user. User verification module 262 may also include the OPAL card identifier (BIN and IEP number) for the user, the funding account and its expiration date, and address information for address verification during the funding portion of the load transaction. An address verification system may compare billing information from an authorization to that on file to assure that the real cardholder is making the transaction.

Smart card emulator 266 emulates a physical smart card by accepting and passing incoming card commands from card reader module 264 and determining actions to perform. In the course of performing these actions, emulator 266 handles the interface to HSM 268, fetches data from, and stores data to, card database 270. For example, upon receiving a command to debit a card, emulator 266 fetches the balance from the appropriate record in database 270 and transfers the encrypted balance to HSM 268 to be decrypted and decremented. Once the new balance is encrypted by HSM 268, emulator 266 receives the new balance and stores it back in the appropriate record in database 270.

Once an action has been performed, emulator 266 generates a simulated smart card response that is then relayed via card reader module 264 and client code module 224 to payment server 206. Preferably, emulator 266 generates card commands that appear as if they have been generated by a physical smart card, thus making emulation of the smart card transparent to the rest of the system. Emulator 266 also updates transaction database 272 at appropriate steps in the processing of a debit or a load.

In addition to debiting or loading a virtual card in card database 270, OPAL server 260 is able to credit a virtual card if the card was debited by mistake. In other words, once a card has been debited to make a payment, OPAL server 260 is able to recover that value and credit the virtual card in the card database if necessary. For example, if a transaction fails and value has been taken off the card, but no value has been credited to a particular payment server, the system is able to credit the virtual card in the card database to replace the lost value. Such an operation is different from a formal load command in that a user's card is being credited for a value that had earlier been taken off the card.

User Perspective of an Internet Transaction

FIG. 10 is a flowchart describing an embodiment of the present invention from a user's perspective such as may occur with the embodiment of the invention shown in FIG. 3. In step 502, a user sets up his or her virtual card within the system. In one embodiment, a physical card in the possession of the user is used to provide some of the information requested by the OPAL server. The user accesses OPAL server 260 over the Internet using an OPAL sign-on URL to access user verification module 262. A screen is presented to the user which requests that the user enter his or her user identifier, a funding account number, the CVV2 (card verification value), expiration date of that account, billing address, electronic mail address, and a chosen password. (The card verification value is a 3-digit value on the signature panel of a card used internationally for fraud deterrence.) Preferably, the first time the user identifier is entered it is in the clear, however, when the identifier is entered by the user subsequently for a transaction it appears masked on the screen so as to be kept secret. User verification module 262 then presents a screen to the user indicating that a confirmation will be sent to the user's electronic mail address. The user then logs out.

Later, an electronic mail confirmation is sent that contains a one-time logon password. The user receives the electronic mail and begins the setup process by logging on to the URL of OPAL server 260 and entering his or her user identifier and one-time password for checking by user verification module 262. Once these are verified, the user is prompted to change the one-time password to a new user-selected password. User verification module 262 then assigns a unique identification number ("OPAL card identifier") to the user.

During this session or at a later time, the user loads value onto the virtual card in step 504. Loading may be accomplished in many different manners. In preferred embodiments, loading is performed by either the loading embodiment discussed in FIGS. 17 and 18A-D, or by the alternative loading embodiment. In another alternative embodiment, a virtual card may come pre-loaded with a certain amount when an account is set up, i.e., the balance in database 270 is positive for a particular record. Other techniques for loading may also be used.

In step 506 the user accesses the merchant server web site via communication link 234a over the Internet. This access of a web site may be performed in any suitable fashion such as by using any commercially available web browser. Once at the merchant web site, the user is prompted to choose payment via either a physical smart card or via the virtual smart card of the present invention. If the user chooses payment via a physical smart card, purchase may proceed as described in U.S. patent application Ser. No. 08/951,614, which is hereby incorporated by reference. If the user chooses the virtual card, the user is prompted for his or her user identifier (which preferably is masked on screen) and password which is verified by OPAL server 260.

Next, in step 508 the user browses the merchant web site and selects goods and/or services for purchase from the merchant using the web site interface that the merchant has provided. The user then selects an appropriate button on the merchant web site to indicate what the user wishes to purchase. Next, in step 510 the user receives a total sale amount from merchant server 208, a current balance from OPAL server 260 and is directed to actuate a button on the web site indicating that the user wishes to proceed with the purchase using the virtual card.

Figure 5:
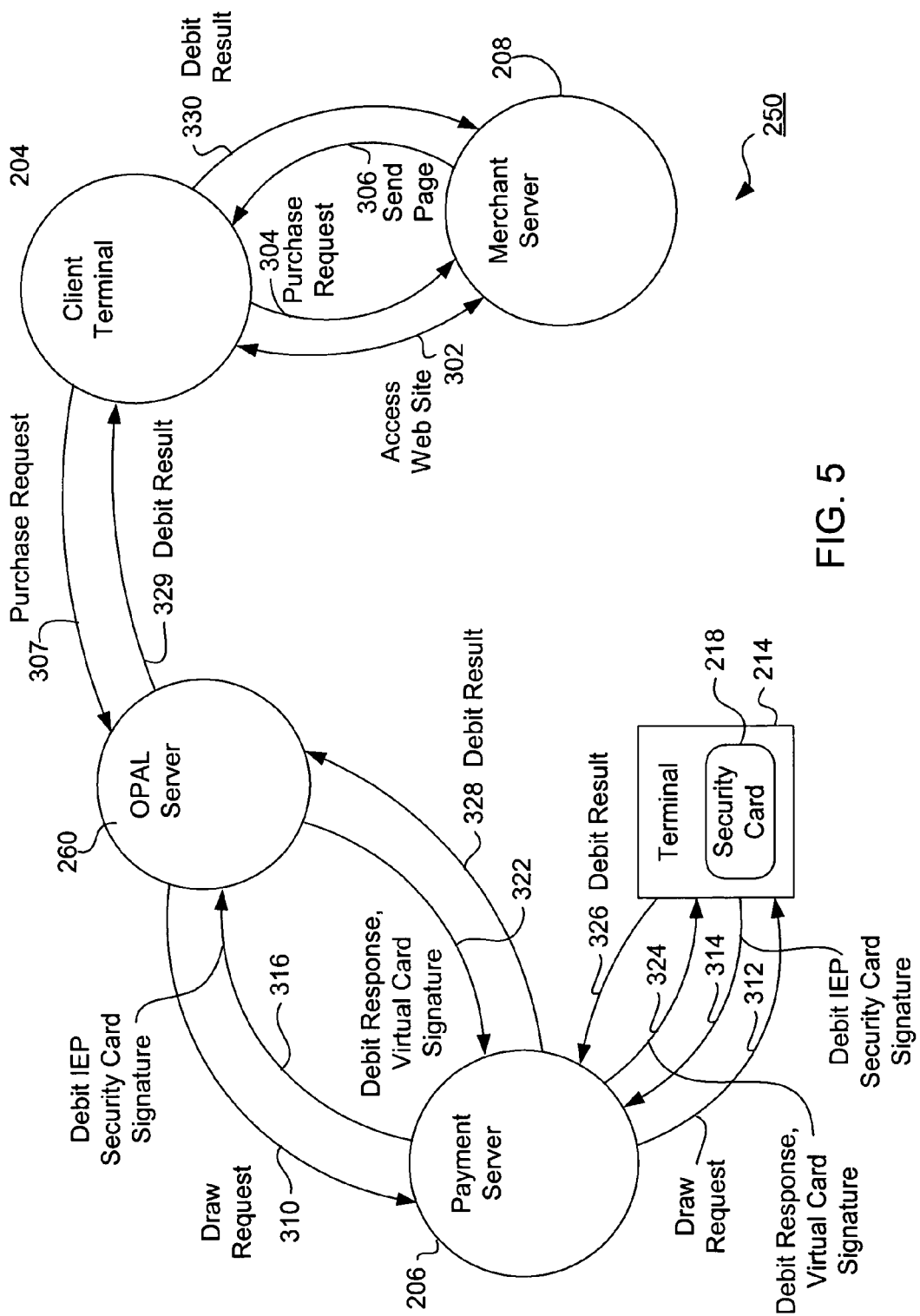
FIG. 5 illustrates in detail a payment embodiment of the present invention.

In step 512 an embodiment of system 250 (such as is shown in FIG. 5, for example) processes the user order by way of payment server 206, OPAL server 260, terminal 214 and security card 218. In step 514 the user's virtual smart card is debited by the total sale amount and the user receives a "debited" message at the user's terminal. This message is optional if the system is designed so as to not inform the user of this debit. In step 516 the user receives a confirmation message from the merchant server indicating that the transaction has been completed. The user may now download the purchased information and/or receive a receipt for goods and/or services to be rendered or delivered from the merchant at a later date. In step 518 the merchant, via a clearing and settlement system, receives payment to its bank account for the goods and/or services rendered by way of information collected from the payment server. In one embodiment of the invention, an existing clearing and settlement system is used, as well as an existing methodology for transferring information from a security card for later reconciliation. This use of an existing "back end" allows the present invention to be implemented more quickly and less expensively.

Detailed Payment Transaction Flow

FIG. 5 illustrates a detailed embodiment of Internet payment and loading system 250 having client terminal 204, payment server 206, merchant server 208 and online purchase and load (OPAL) server 260. A security card 218 inside terminal 214 is in communication with payment server 206. Not shown for simplicity in this figure are other elements of the system shown in FIGS. 3 and 4. One embodiment of a technique by which a financial transaction may be completed over the Internet using a virtual smart card will now be described using the flowchart of FIGS. 11A through 11D with reference to FIG. 5. It should be appreciated that a wide variety of terminology may be used to describe message flow throughout system 250 in lieu of the terms "Draw request", "Debit IEP", "Debit response", and "Debit result" used below.

Initially, a suitable web browser of client terminal 204 is used by the user to access a merchant server web site as indicated at 302. In step 602, the user selects goods and/or services from the merchant site and indicates to the site that the user wishes to purchase these items using a virtual smart card as indicated at 304. In step 604 the merchant server receives this request for a virtual card transaction.

In step 606 the merchant server builds an HTML page that includes the following parameters: the total cost of the transaction as determined by the merchant server; the type of currency being used; the port and IP address of the payment server; a unique transaction identifier used by both the payment server and the merchant server to track a transaction; and a unique merchant identifier assigned to the merchant by the acquirer and known to the payment server. Other information may also be included such as the currency's exponent, a status URL address of the merchant server used for communication from the client terminal, and a merchant server generated key and other security information to ensure the identity of the merchant server and the integrity of the message. Other process related information such as software release level, encryption methodology and keys may also be conveyed. Once this page has been built, the page is sent 306 to the requesting client browser and triggers the loading of a client terminal module (in this example a Java applet) in the client terminal.

Some browsers may not allow an applet to invoke a dynamic link library (DLL) due to security reasons. In an embodiment of the present invention, the client terminal applet along with any DLLs needed are preloaded on the client terminal. Then, the merchant server is allowed to invoke the client terminal applet and DLLs dynamically to circumvent this security precaution. In an alternative embodiment, the client applet is signed to ensure its authenticity and integrity.

The client terminal module 290 then displays a screen containing the amount provided by the merchant and requests that the user authorize the amount by entering their user identifier (which preferably is masked on screen) and password. Once entered, client terminal module 290 routes the purchase request 307 (including purchase parameters from the merchant server, user identifier and password) to OPAL server 260. OPAL server 260 then validates the user identifier and password with user verification module 262.

In step 608 client code module 224 of OPAL server 260 then interacts with pseudo card reader module 264 to build a draw request message for later transmission 310 to payment server 206. It should be noted that at this point two types of emulation are occurring. Unlike a prior art payment service terminal that would include both a smart card and a security card in close physical proximity, OPAL server 260 neither includes a physical smart card nor a security card. The physical card is represented as a virtual card in a record of card data base 270, while security card 218 is attached to a remote payment server. Thus, as previously described in FIG. 2, client code module 224 will emulate commands that a security card would issue to build the draw request, while pseudo card reader module 264, smart card emulator 266 and data base 270 emulate a physical smart card.

In one embodiment of the invention, client code module 224 loads a local DLL, makes an API call to that library, which in turn makes a call to another DLL that finally makes a call to pseudo card reader 264. Preferably, the "Initiate IEP for Purchase" command is created and forwarded to emulator 266 via card reader module 264. The command is modified in any suitable fashion to identify which record in data base 270 will be debited (i.e., which virtual card); for example, the user identifier or password may be included. Next, emulator 266 parses the incoming command and does a database fetch to obtain the virtual card record from data base 270. In other embodiments, the fetch may be optimized to only retrieve certain information. Emulator 266 then sends the record to HSM 268 for decryption of the card data found in the record.

Once responses to "Initiate IEP" from reader 264 are received, client module 224 combines these responses into a byte stream suitable for transmission over a network to a payment server. Also at this point, the currency type and expiration date of the virtual card in data base 270 are checked, and the total cost of the ordered merchandise is checked against the card balance to ensure that the value on the card is great enough to cover the transaction. If the checks are not successful, a message to that effect is delivered to the user and this transaction terminates.

Because security card 218 is remotely located it would not be advantageous to engage in numerous commands and responses between the security card and client code module 224 over an open network such as the Internet. In the interest of speed and reliability, it is advantageous to have fewer messages exchanged. Accordingly, client module 224 emulates a variety of security card commands in order to receive responses to these commands from pseudo card reader 264. To operate securely and reliably in this environment, in one embodiment of the present invention, client module 224 emulates a security card and gathers all the responses for transmission in one draw request message. These commands and responses between client code module 224 and pseudo card reader 264 occur as if there were an actual card reader with a physical smart card inside; in other words, client code module need not be aware that a virtual card is being used.

The draw request message may include a variety of information including a draw request token, state information, the merchant identifier, the transaction identifier, security information, a purse provider identifier, an intersector electronic purse (IEP) identifier, an algorithm used by the card, an expiry date, the balance of the card, a currency code, a currency exponent, the authentication mode of the IEP, the transaction number of the IEP, a key version and the purchase amount. As all of this information is prepackaged into a single draw request message, the number of messages over the Internet between OPAL server 260 and payment server 206 is greatly reduced.

In this embodiment, the draw request message is built by packaging the virtual card's response to the "Reset" and "Initiate IEP for Purchase" commands, any public key certificates, the total cost, and the currency of the transaction received from the HTML page. For public key cards, the card and issuer certificates are obtained from read commands and may also be included in the draw request. By packaging all of this information together into one draw request message, it is possible to cut down on the number of messages exchanged between OPAL server 260 and payment server 206 and reliability and speed is improved.

Next, in step 610 OPAL server 260 accesses payment server 206 using the IP address received from the merchant server. In step 612 OPAL server 260 sends the draw request message to payment server 206 as indicated at 310. OPAL server 260 also creates a log of this message being sent.

In step 614 payment server 206 sends to terminal 214 draw request 312 and processes the draw request in conjunction with an associated security card 218 as will be explained in greater detail below with reference to FIG. 11D. In one embodiment of the invention, the payment server creates a transaction thread for each connected client module 224 to service it through the life cycle of the transaction. After step 614, payment server 206 has received a "Debit IEP" command and a security card signature (S2) 314 from security card 218.

The security card signature (S2) is a value that uniquely identifies and validates security card 218 to prove to OPAL server 260 that the incoming debit command is a valid command from a real security card. This validation ensures that when the virtual card is debited the financial totals in the security card are updated. Thus, the user of the virtual card is guaranteed that a valid debit of the card has occurred. In a preferred embodiment of the invention, the security card signature is an encrypted value ensuring that no other entity can forge an identity of a security card.

In step 616 the payment server sends the debit command along with the security card signature 316 to OPAL server 260 to allow the virtual card to debit itself. At this time, payment server 206 also logs the debit command into its database. Upon receiving the debit command from the payment server, client module 224 replaces the amount in the debit command with the original amount (from the merchant server) to ensure that the amount has not been tampered with while traveling over the network. At this time, client module 224 may also create a log of the debit command.

In step 618 client module 224 forwards the debit command and security card signature to emulator 266 which again retrieves the appropriate virtual card record from data base 270 for processing. Because HSM 268 does not store data, the card record is retrieved each time the HSM is used. Alternatively, the card record is retained in memory while a transaction is occurring. The card record, debit command and signature are sent to HSM 268 where the security card signature (S2) is verified and a virtual card signature (S3) is generated. The card record is updated in HSM 268 with revised parameters (including balance and transaction counter) to reflect the purchase transaction and returned to the card data base. Client module 224 receives the HSM response and generates a "Debit Response" message along with the card signature (S3). If the virtual card does not have enough value to satisfy the purchase amount, then the "Debit Response" message indicates as such. Card signature S3 is a unique value identifying a valid virtual card in card data base 270. In a preferred embodiment of the invention, the signature is in encrypted form to prevent tampering.

In step 620, emulator 266 sends the response message along with the card signature back to client module 224. At this point, the purchase amount has been deducted from the balance on the virtual card (assuming a successful transaction). Next, in step 622; client module 224 packages the response message 322 along with the card signature and sends them back to payment server 206. Client module 224 also logs the result of this virtual card debit.

In step 624 payment server 206 receives incoming message 322 and creates a log and updates the transaction status in its database for future error recovery. Payment server 206 then directs this received message 324 to security card 218 in terminal 214. Next, in step 626 the security card processes this response from the OPAL server and verifies the received virtual card signature.

As security card 214 contains the keys and algorithms necessary to compute card signatures, the security card is able to validate that a received virtual card signature is in fact a valid one by comparing this card signature with a generated expected value. A successful comparison indicates that a response message 324 received from the virtual card is in fact a valid message and that the virtual card has been debited. An error result code or a comparison that is not successful potentially indicates that the virtual card has not been debited. This comparison of card signatures by the security card ensures that a virtual card is in fact debited before the merchant server is directed to release the purchased merchandise to the user. This comparison of the virtual card signature to an expected value is performed by the security card for the highest level of security. As will be described in the embodiments of FIGS. 6, 7, and 8, this comparison of virtual card signatures may also take place in payment server 206, in OPAL server 260, in client terminal 204 or in merchant server 208 with a variety of other advantages. Assuming that the transaction is so far valid, in step 628 the security card sends a response indicating the result of the signature verification. The payment server uses this response to build the "Debit Result" message. If the transaction were invalid or the verification failed, an exception would be returned.

In step 630 terminal 214 updates its data store with the virtual card number, a transaction count, the total sale amount, the response from the security card, and transaction numbers from the virtual card and from the security card. The payment server also logs the response received from the terminal along with the merchant identifier, etc., as indicated in step 632. Next, in step 634, the payment server packages the result message including the transaction identifiers and sends this message 328 to OPAL server 260 in encrypted form. Server 260 passes the result to emulator 266 for appropriate database updates such as balance and counter. The transaction is also logged in the history file.

The result message is then forwarded 329 to client terminal 204. At this point, the transaction thread of the payment server that was used for the current transaction may release the terminal, thus allowing the terminal to be used by other transactions. This transaction thread then exits at this time.

Figure 15A:
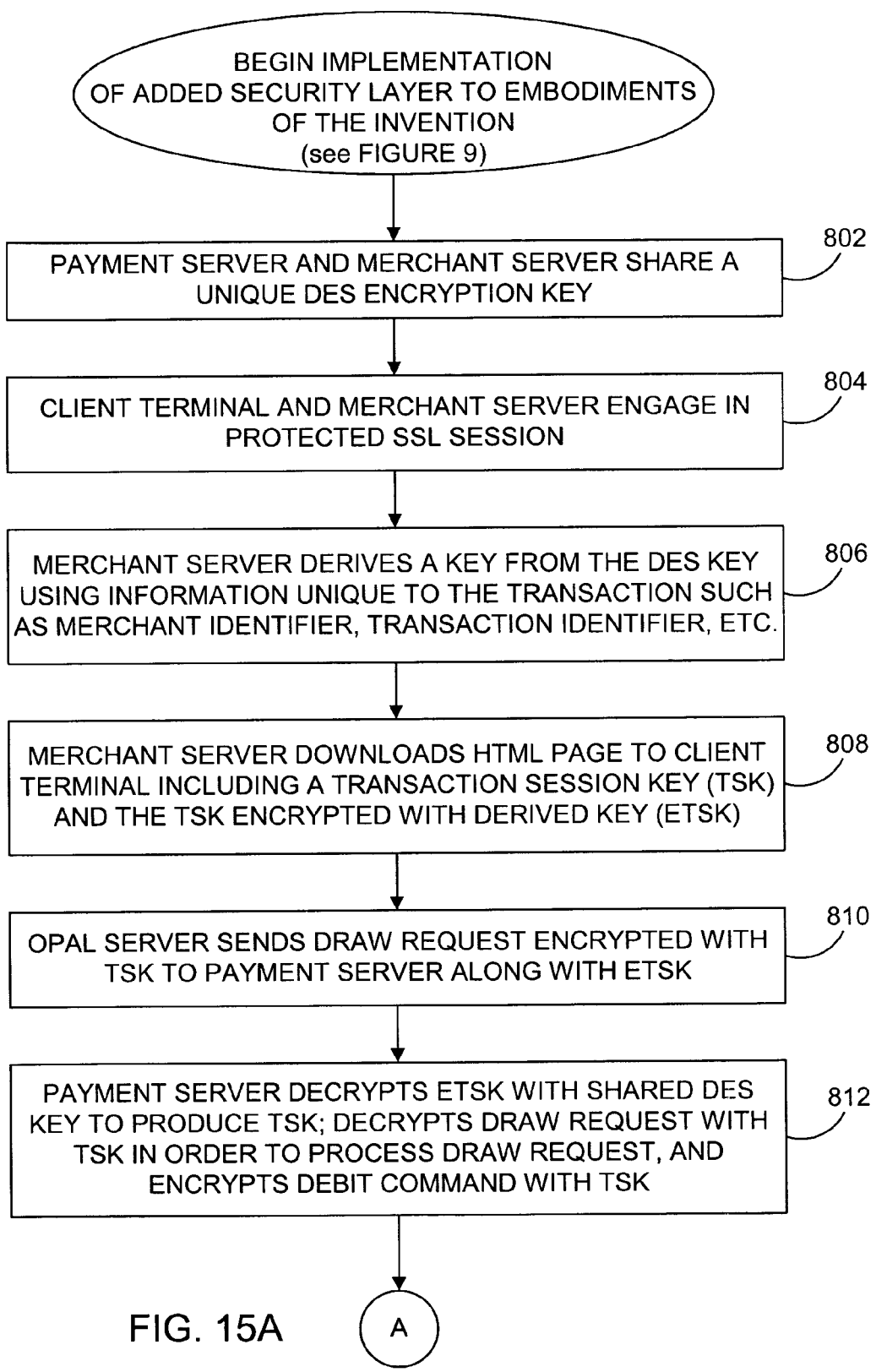
FIGS. 15A and 15B are a flowchart describing the added security layer of FIG. 9.
Figure 15B:
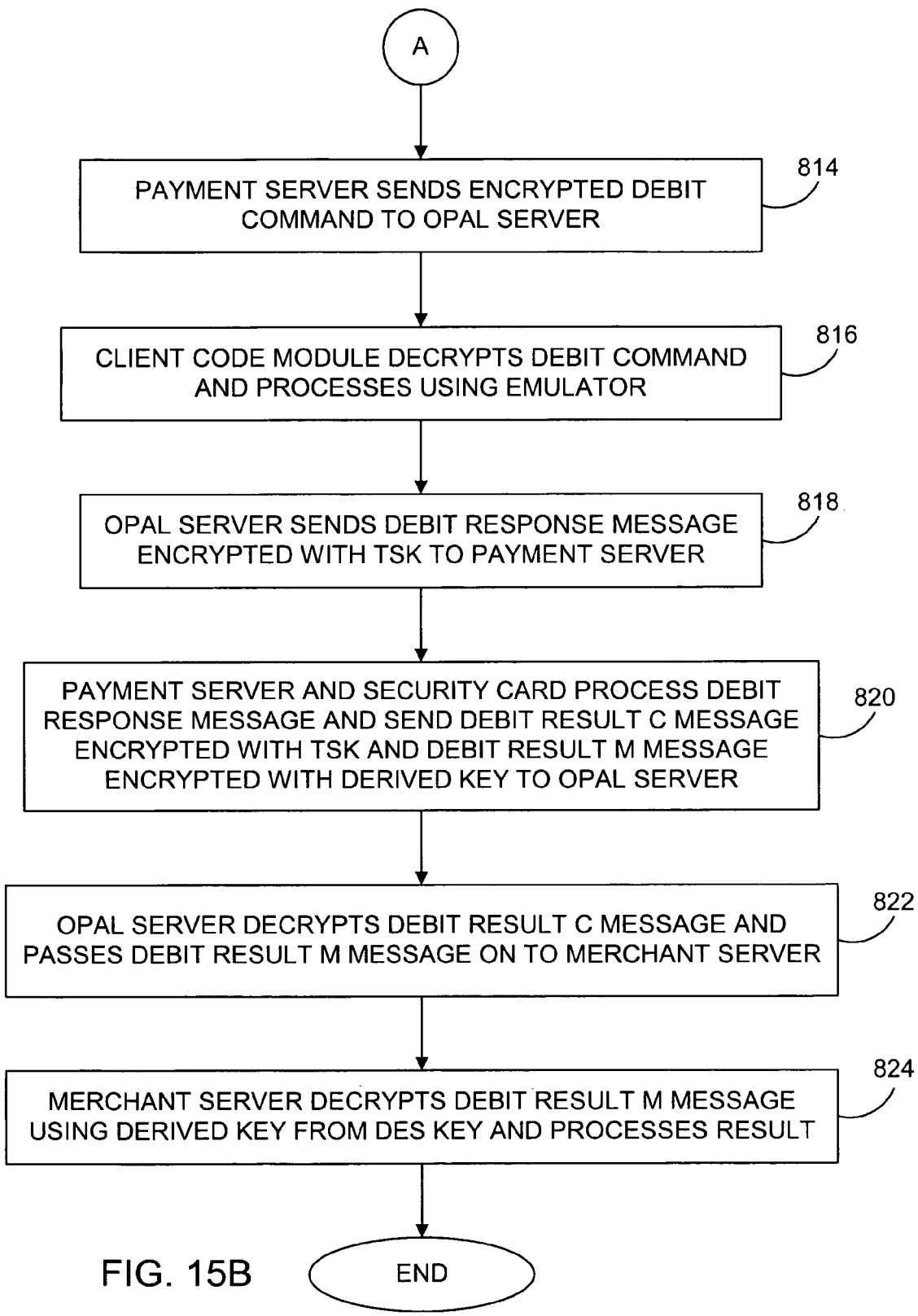

By sending this result message in encrypted form, the confirmation included in the message may be passed to the merchant server by way of the client terminal without fear of tampering. As the result message is encrypted, it would be extremely difficult for the client terminal or another entity to forge a confirmation and trick the merchant server into thinking that a transaction had taken place. In another embodiment of the invention, if the client terminal is a trusted agent, then the result message need not be encrypted. In yet another embodiment, payment server 206 may send two confirmation messages, one not encrypted for the client terminal to process, and one encrypted for the merchant server, or both messages encrypted under different keys. FIGS. 15A and 15B present an embodiment in which payment server 206 sends two messages back to client terminal 204.

In step 636 the client terminal then passes the result message 330 on to merchant server 208 at the URL address previously received from the merchant server. The client may also post a message to the user informing that the debit has been completed. The client may also log confirmation of the payment. In step 638 the merchant server registers the confirmation included in the message and checks for success. The merchant server calls a validate routine within the merchant code module to validate the result message received via the client terminal. The validate routine decrypts the transaction identifier along with the encrypted result message. If the decrypted result message is acceptable, the merchant server then determines that a successful transaction has occurred. Next, in step 640 the merchant server generates a message with the purchased information and delivers this information to the client terminal. Alternatively, the merchant server may generate a purchase receipt to deliver to the client terminal indicating goods and/or services to be rendered. At this point, the client terminal may log the merchant server's response. Completion of these steps indicates a successful financial transaction over the Internet using a virtual smart card.

Returning now to a more detailed discussion of step 614, FIG. 11D describes one technique for processing a draw request message in conjunction with a security card 218. Once this draw request message has been received by payment server 206 and passed along to terminal 214, the terminal parses the message back into individual responses and passes these responses sequentially to the security card as will be explained below. In an alternative embodiment, a dumb terminal is used and the draw request is parsed into its components and otherwise processed by the payment server, which then sends the responses to the security card itself.

In step 680 payment code module 228 of payment server 206 edits the draw request for syntactic correctness and logs the draw request message as being received. In step 682 the draw request is passed to terminal interface 230 of the payment server. In one specific embodiment, the terminal interface then requests a terminal from the payment server's terminal pool. The payment server may have a pool of terminals connected to a terminal concentrator that is established at start-up. At start-up, the payment server receives a list of all valid terminal identifiers. The payment server uses these identifiers, and its knowledge of transactions in progress to determine an appropriate terminal to process the transaction. Once a terminal is determined, the terminal interface builds a terminal specific message based upon the draw request and the type of terminal.

In step 686 the terminal specific draw request 312 is sent to chosen terminal 214 over a local area network. A concentrator may act as a router between a transaction thread in the payment server and a corresponding terminal if many terminals are attached to the payment server. The concentrator looks at a header on the draw request to determine to which terminal the transaction should be routed. In one embodiment of the invention, concentrator 212 is not necessary and payment server 206 communicates directly with terminal 214.

In step 688 terminal 214 parses the draw request message into its various components and processes each component in turn to emulate a card interacting with the security card in a physical terminal. Prepackaging of a variety of information into the draw request message results in fewer exchanges over the Internet between OPAL server 260 and payment server 206. By now simulating an interaction, security card 218 behaves as if it were in a physical terminal along with an actual smart card. A variety of responses from a smart card may be emulated. In this embodiment, the terminal sends each of the two commands "Answer to Reset" and "Initialize IEP for Purchase" down to the security card individually and waits for a return message, "Debit IEP," before sending the next response. For a public key transaction, the certificates read by the client are also included as individual responses. In this fashion, even though all of the smart card information (the draw request) originating from OPAL server 260 has been sent at once in prepackaged form over the Internet, the traditional interaction between a smart card and the security card in a physical terminal is simulated at terminal 214 in a remote location.

In step 690 terminal 214 reaches a "draw amount" state, indicating that security card 218 is able to generate a debit command. In step 692, the security card generates its security card signature and the command "Debit IEP". This signature and debit command 314 are sent to terminal 214. The debit command issued by the security card may contain a wide variety of information including the security card identifier, the transaction identifier, the amount to be debited, the currency and currency exponent for the amount, the security card signature, the date, time, and location. The terminal in turn, sends the signature, command, and the terminal identifier to the payment server as indicated in step 694 and shown as 314. At this point, step 614 ends and control returns to step 616.

First Alternative Payment Embodiment

Figure 6:
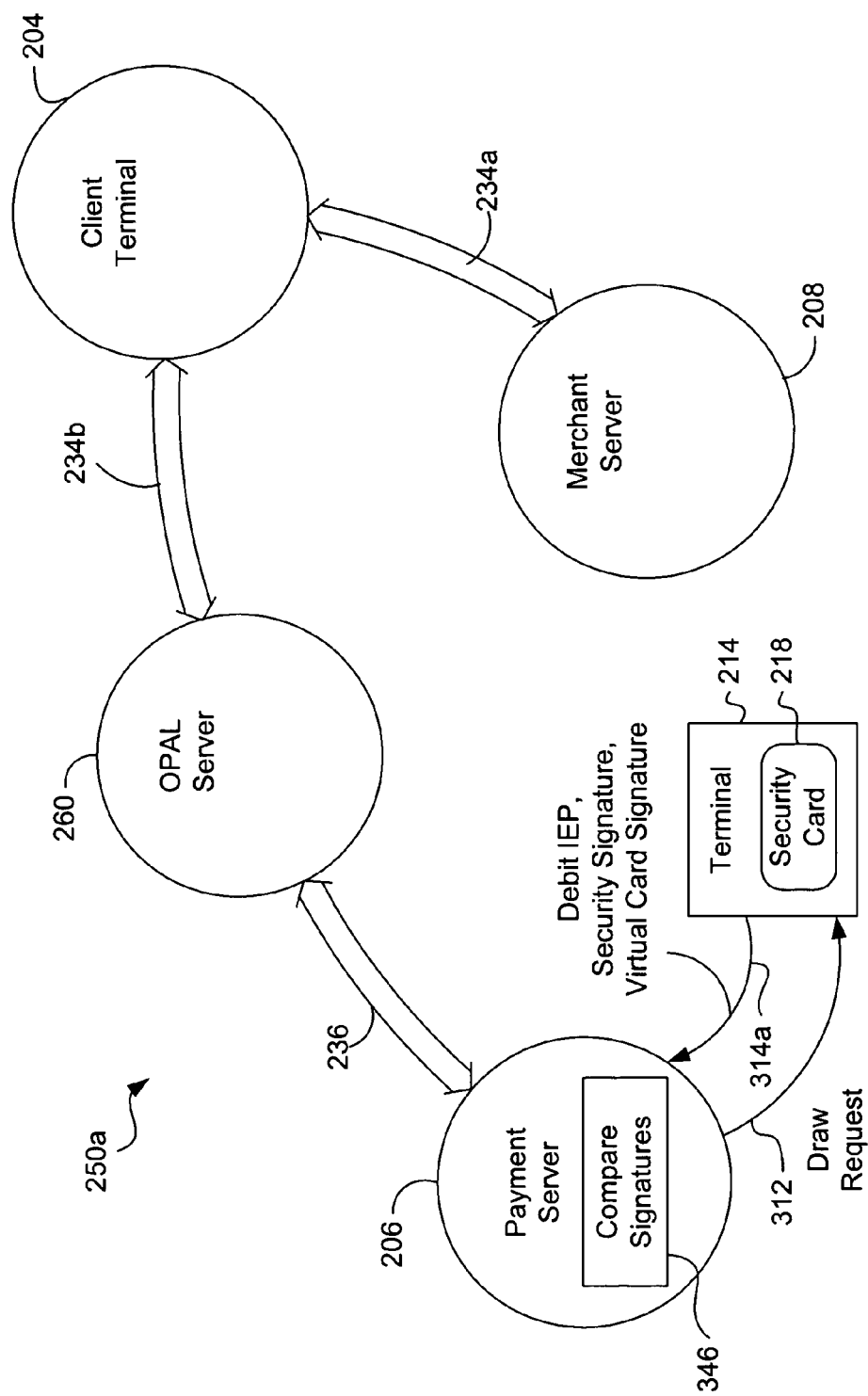
FIG. 6 illustrates another payment embodiment of the present invention in which the security card releases earlier.

FIG. 6 illustrates an alternative embodiment 250*a* in which security card 218 is able to be released sooner than the security card of FIG. 5; this embodiment also requires fewer exchanges between terminal 214 and payment server 206. A security card in a terminal is dedicated to a particular transaction from the moment when the terminal interface selects that terminal until the security card finally issues a "Debit Result" message and is released by the terminal interface. In some circumstances it is desirable to release the security card earlier. By releasing a security card earlier, the card is tied up for a shorter time per transaction and may move on to the next transaction sooner. Also, the less time that a terminal is dedicated to a particular transaction, and the fewer messages exchanged between the two, the less likely chance there is of a communication error that might interrupt and halt the transaction.

Embodiment 250*a* includes client terminal 204, OPAL server 260, payment server 206, merchant server 208, and terminal 214 having security card 218. Communication between the servers may take place in a similar fashion as in FIG. 5 as indicated by communication links 234*a*, 234*b* and 236. Instead of two round trips of information between the terminal and payment server, however, there is only one round trip in this embodiment.

Figure 12:
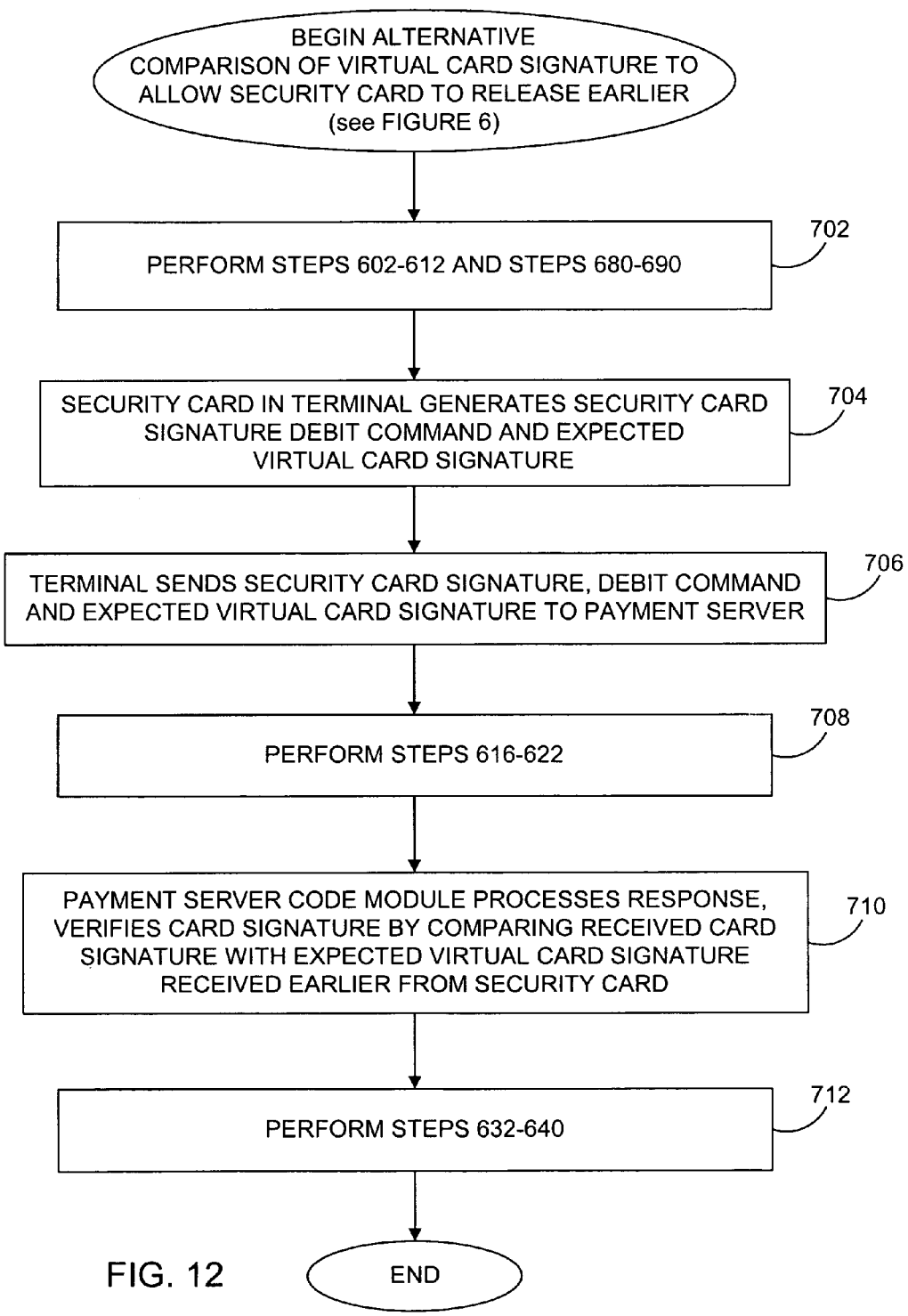
FIG. 12 is a flowchart describing the alternative embodiment of FIG. 6.

FIG. 12 is a flowchart that describes a technique for implementing this embodiment with reference to FIG. 6. Step 702 indicates that communication between the various entities takes place in a similar fashion as in FIG. 5 up until terminal 214 reaches the "draw amount" state. At this point, draw request 312 has been received and processed by security card 218. Next, in step 704 the security card generates not only the security card signature S2 and the Debit IEP command, but also the expected virtual card signature S3 from emulator 266 and HSM 268. This expected virtual card signature is a value expected by the security card from the virtual card to validate the virtual card's Debit Response message. This validation will ensure that the virtual card has been debited in card data base 270.

In step 706 the security card signature S2, the Debit IEP command and the expected virtual card signature S3 are sent to the payment code module in the payment server as indicated at 314*a*. Also, the terminal updates its data store in a similar fashion as in step 630. Next, step 708 indicates that the transaction occurs as before with reference to step 616-622. These steps indicate that emulator 266 receives the Debit IEP command, debits the virtual card in data base 270, and returns the Debit Response message and the virtual card signature S3 to the payment server.

Next, in step 710 the payment server code module processes this response from emulator 266 by comparing 346 the received virtual card signature S3 with the expected virtual card signature received earlier from the security card. This comparison of the two signatures by the payment module of the payment server obviates the need for another round trip between the payment server and the security card. Because the security card has already delivered the expected card signature S3 to the payment server, the security card may be released as soon as message 314*a* is received.

Assuming that the comparison is successful, the payment module is then able to generate its own Debit Result message instead of waiting for a message from the security card. Next, step 712 indicates that the processing continues in a similar fashion as in steps 632-640. The Debit Result message is passed on to the merchant server by way of the client terminal and the merchant server may then deliver the purchased merchandise to the user.

Second Alternative Payment Embodiment

Figure 7:
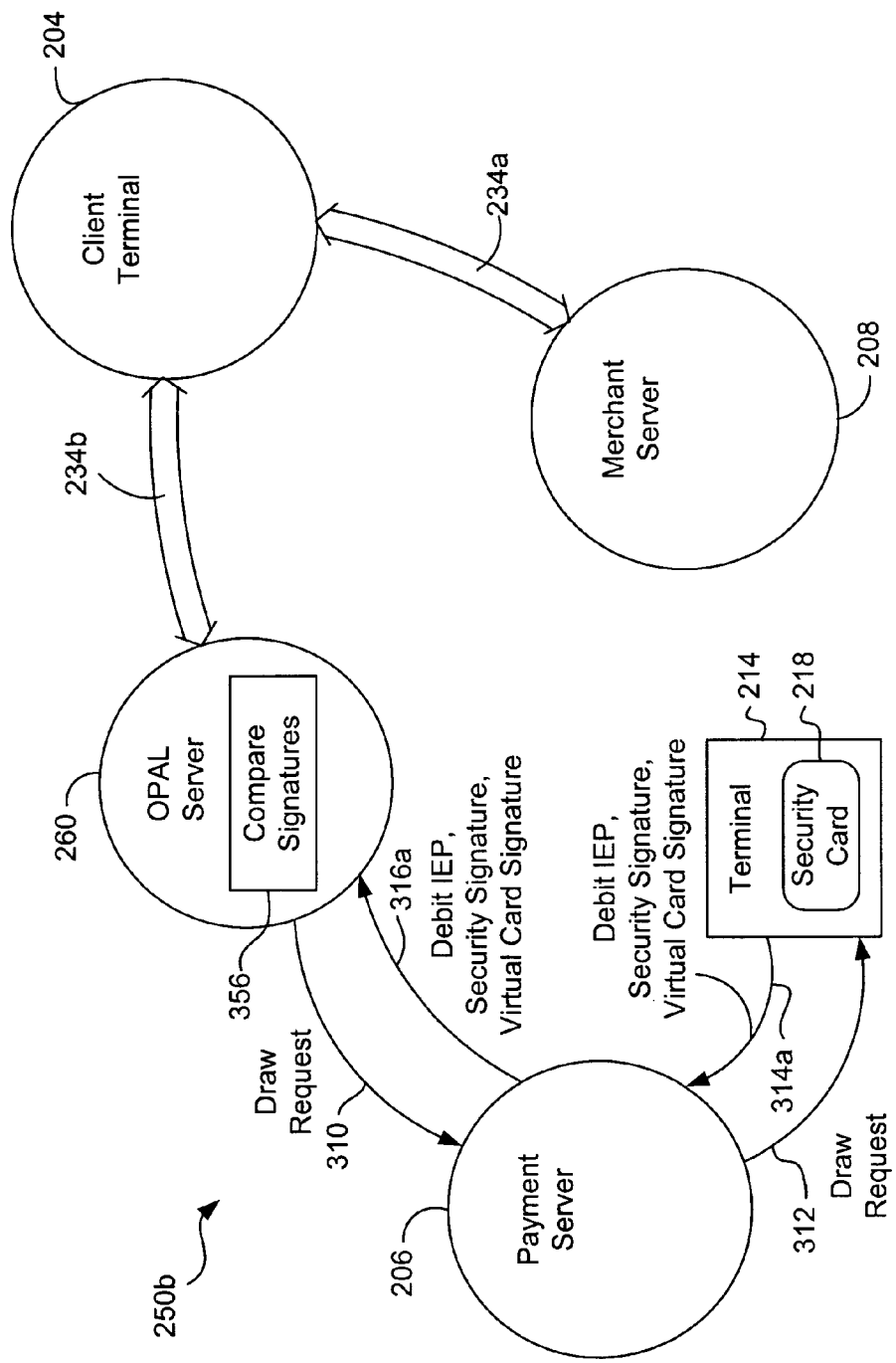
FIG. 7 illustrates yet another payment embodiment of the present invention having fewer round trip messages between the OPAL server and payment server.

In another embodiment 250*b* of the present invention as illustrated in FIG. 7, not only is security card 218 allowed to release earlier, but the number of messages exchanged between OPAL server 260 and payment server 206 are reduced. Instead of comparing virtual card signatures in the payment server, the expected virtual card signature from the security card is transmitted to OPAL server 260 where a trusted agent 356 performs the comparison of the expected virtual card signature with the actual signature S3 received from emulator 266. Thus, message exchange between OPAL server 260 and payment server 206 is reduced to one round trip. This is advantageous because the time for a transaction is reduced, the security card is released earlier and fewer messages are exchanged, leading to more reliability over the Internet.

Embodiment 250b includes client terminal 204, OPAL server 260, payment server 206, merchant server 208 and terminal 214 having security card 218. Communication between the OPAL server, the client terminal and the merchant server may take place in a similar fashion as in FIG. 5 as indicated by communication links 234a and 234b.

Figure 13:
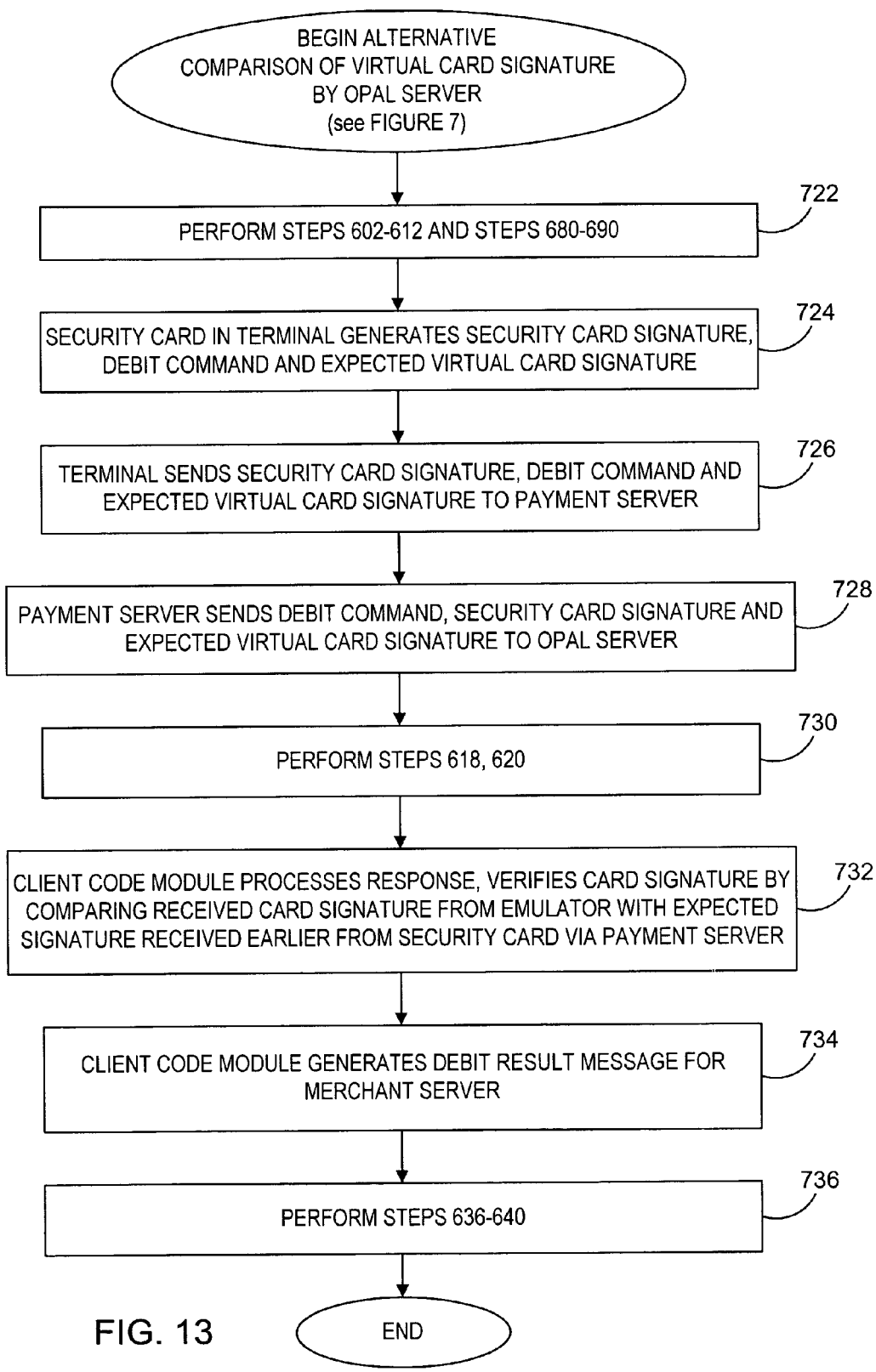
FIG. 13 is a flowchart describing the alternative embodiment of FIG. 7.

FIG. 13 is a flowchart that describes a technique for implementing this embodiment with reference to FIG. 7. Step 722 indicates that communication between the various entities takes place in a similar fashion as in FIG. 5 up until terminal 214 reaches the "draw amount" state. At this point, draw request 312 has been received and processed by security card 218. Next, in step 724 the security card generates not only the security card signature S2 and the Debit IEP command, but also an expected virtual card signature S3.

In step 726 the security card signature, the Debit IEP command and the expected virtual card signature are sent to payment code module 228 in payment server 206 as indicated in 314a. Also, the terminal updates its data store in a similar fashion as in step 630. Next, in step 728 the payment server code module sends the Debit IEP command, security card signature and expected virtual card signature to OPAL server 260.

Next, step 730 indicates that the transaction occurs as before with reference to steps 618 and 620. The steps indicate that emulator 266 receives the Debit IEP command and debits the virtual card in data base 270. In step 732, client code module 224 itself compares the actual card signature S3 from emulator 266 with the expected signature from the security card. This comparison of the two signatures by client module 224 of the OPAL server obviates the need for another round trip between the payment server and the OPAL server. Also, because the security card has already delivered the expected card signature to the payment server, the security card may be released as soon as message 314a is received.

Assuming that the comparison is successful, OPAL server 260 is then able to generate its own Debit Result message in step 734 instead of waiting for the message from the payment server. Next, step 736 indicates that the processing continues in a similar fashion as in steps 636-640. The Debit Result message is passed on to the merchant server via client terminal 204 and the merchant server may then deliver the purchased merchandise to the user.

In a variation on this embodiment, the expected signature and the generated virtual card signature S3 can be passed on to client terminal 204 which performs the comparison and generates the Debit Result message.

Third Alternative Payment Embodiment

Figure 8:
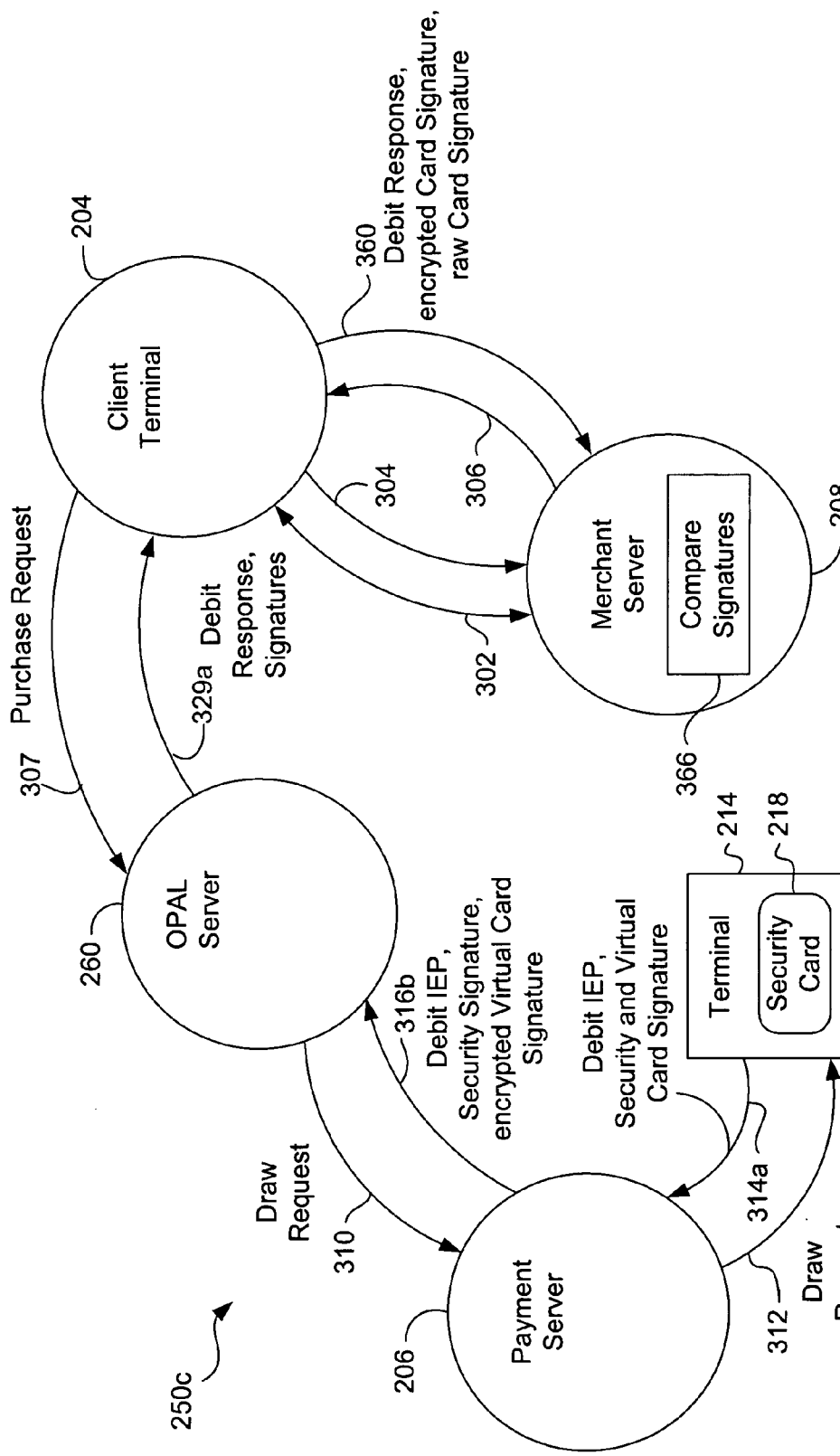
FIG. 8 illustrates still another payment embodiment of the present invention in which the merchant server compares virtual card signatures.

FIG. 8 illustrates another embodiment 250c of the invention in which merchant server 208 performs the comparison of the virtual card signature S3 with the expected signature. Embodiment 250c includes client terminal 204, payment server 206, OPAL server 260, merchant server 208 and terminal 214 having security card 218. This embodiment has all of the advantages of the previous embodiment in which the security card is released earlier, and there are also fewer messages passed between the entities. In this embodiment, if OPAL server 260 or client terminal 204 is not to be trusted to compare the virtual card signatures, then an encrypted expected signature is passed to the merchant server via the OPAL server and the client terminal. OPAL server 260 also passes the raw, unencrypted signature S3 from the virtual card to the merchant server. A routine 366 in the merchant server then compares the two signatures.

Figure 14:
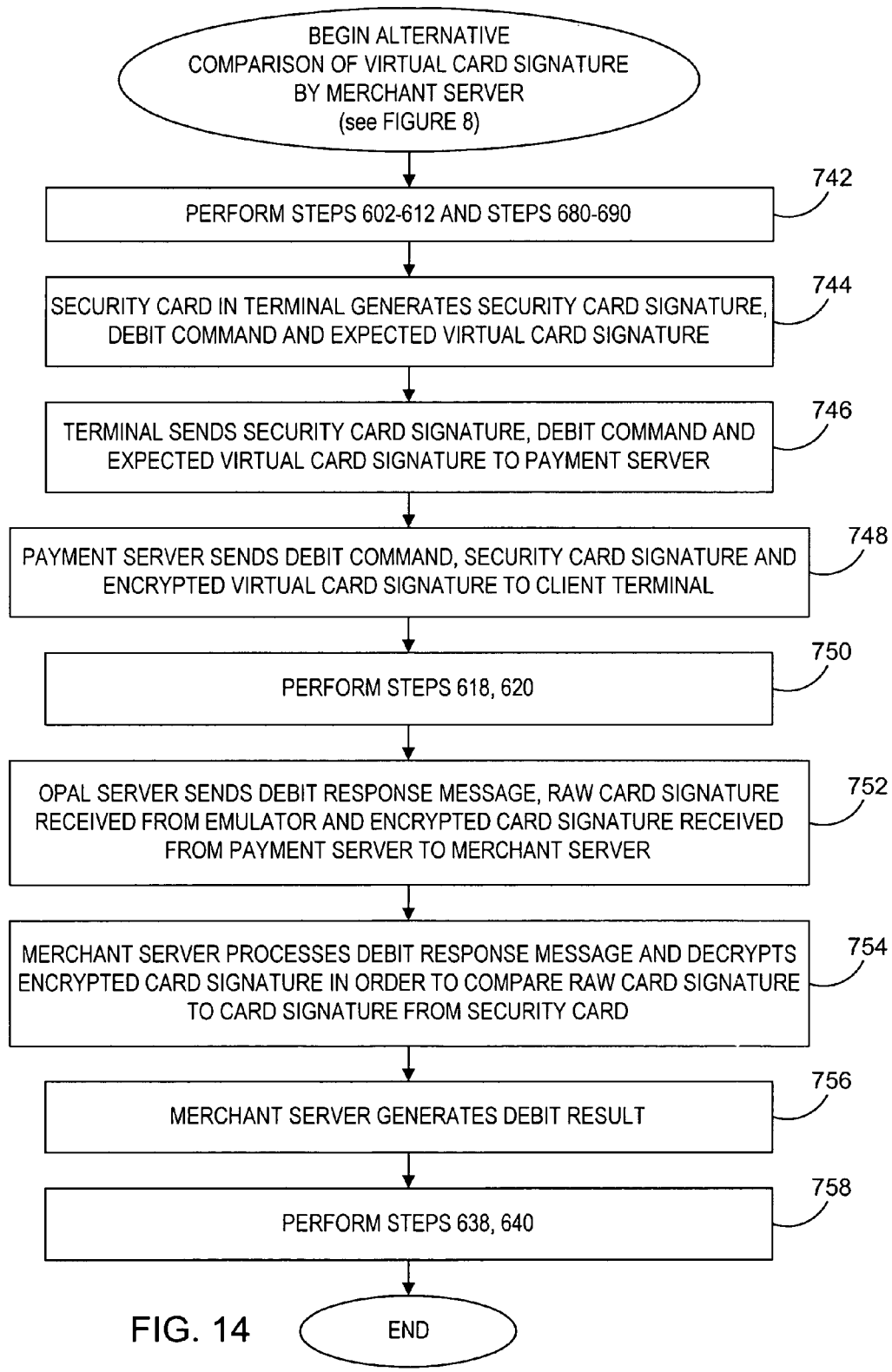
FIG. 14 is a flowchart describing the alternative embodiment of FIG. 8.

FIG. 14 is a flowchart that describes a technique for implementing this embodiment with reference to FIG. 8. Step 742 indicates that communication between the various entities takes place in a similar fashion as in FIG. 5 up until the terminal reaches the "draw amount" state. At this point, draw request 312 has been received and processed by security card 218. Next, in step 744 the security card generates not only the security card signature S2 and the Debit IEP command, but also an expected virtual card signature S3.

In step 746 the security card signature, the Debit IEP command and the expected virtual card signature are sent to payment code module 228 in the payment server as indicated in 314a. Also, the terminal updates its data store in a similar fashion as in step 630. Next, in step 748 the payment server code module encrypts the expected virtual card signature and sends the Debit IEP command, security card signature and an encrypted expected virtual card signature to OPAL server 260. The expected virtual card signature is encrypted to prevent tampering by client terminal 204, OPAL server 260 or other outside entity.

Next, step 750 indicates that the transaction occurs as before with reference to steps 618 and 620. The steps indicate that emulator 266 receives the Debit IEP command, debits the virtual card in data base 270 and generates Debit Response and the raw virtual card signature S3. In step 752, client code module 224 sends the Debit Response message, the raw virtual card signature and the encrypted signature on to merchant server 208 via client terminal 204. In step 754 the merchant server processes the Debit Response message, decrypts the encrypted signature, and compares the two signatures. This comparison of the two signatures by the merchant server obviates the need for another round trip between the payment server and the OPAL server. Also, because the security card has already delivered the expected card signature to the payment server, the security card may be released as soon as message 314a is received.

Assuming that the comparison is successful, the merchant server is then able to generate its own Debit Result message in step 756 instead of waiting for the message from the security card. Next, step 758 indicates that the processing continues in a similar fashion as in steps 638 and 640. The merchant server may then deliver the purchased merchandise to the user.

Encryption Layer Embodiment

Figure 9:
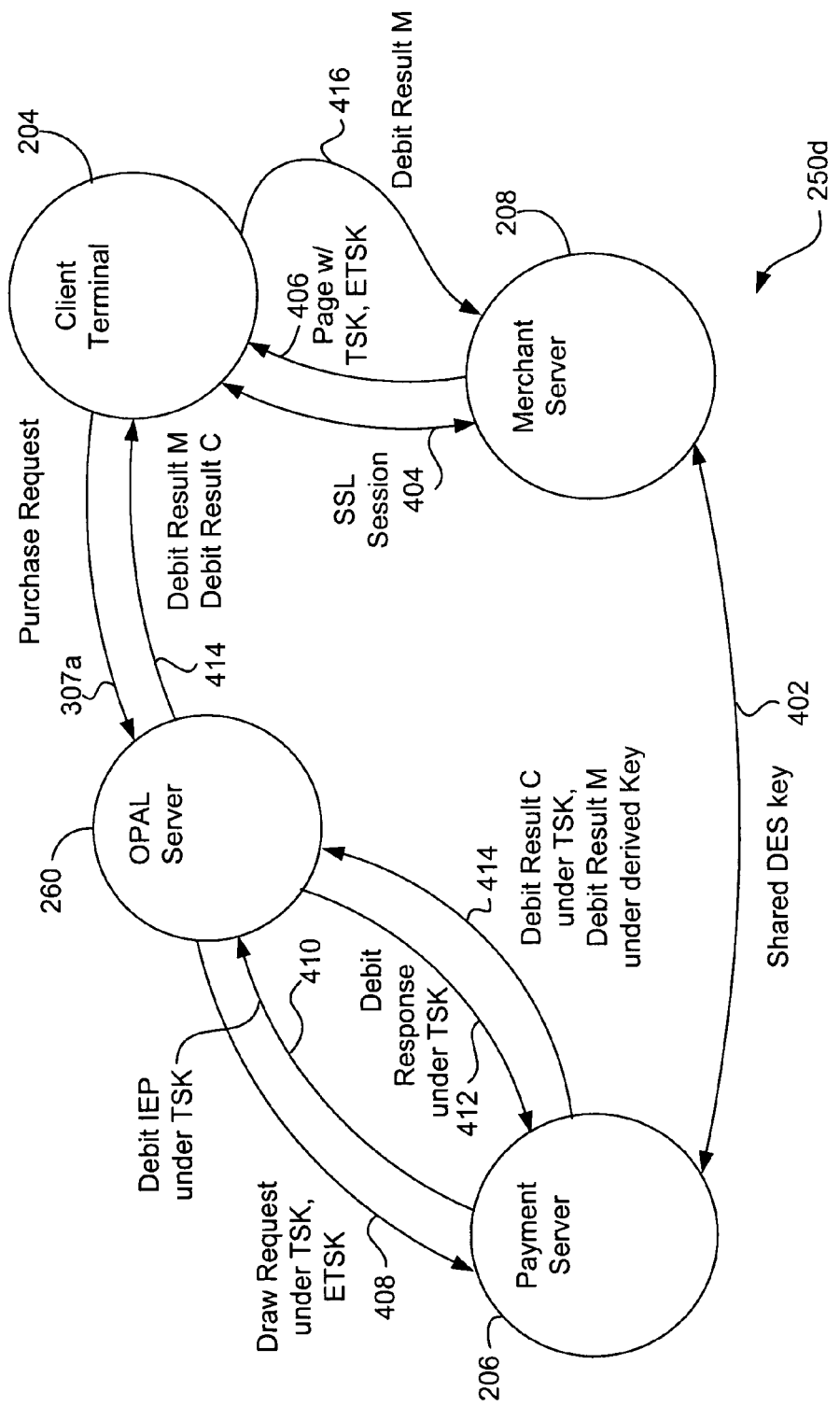
FIG. 9 illustrates an added encryption layer useful for embodiments of the present

FIG. 9 illustrates an embodiment 250d of the present invention in which an encryption layer has been added. Although the present invention may be practiced without this added encryption layer, in a preferred embodiment of the invention this encryption layer is used. FIG. 9 includes client terminal 204, payment server 206, OPAL server 260 and merchant server 208. Other elements of the system have been omitted in this figure for simplicity. This extra encryption layer is used not only to protect the contents of messages being transmitted over the Internet, but also to prevent a client terminal, server or other entity from receiving or producing a message that would trick another entity into thinking that a valid transaction had occurred. This encryption also prevents messages from being accidentally or deliberately altered or misdirected. In addition, it should be appreciated that encryption may be present in any embodiment on all parts of any message sent for security. Preferably, any signature sent over a network is encrypted.

FIGS. 15A and 15B are a flowchart describing this embodiment of the invention with reference to FIG. 9. In step 802 payment server 206 and merchant server 208 share a unique encryption key 402. Through a prior business arrangement, both of the servers have arranged to share this unique key to add security to the transaction. The shared key may be of any suitable encryption standard and of any length. The key may be a Data Encryption Standard (DES) key having a length of 128 bits including parity. Although this shared key could be used directly, in a preferred embodiment of the invention there is a derived unique key for each transaction between the merchant server and the payment server. Alternatively, another encryption standard such as RSA may be used. Preferably, loading of value is performed under DES, while a purchase may be performed under either DES or public key technology.

In step 804 client terminal 204 and merchant server 208 engage in a protected Secure Sockets Layer (SSL) session 404 in which a connection is made, a user browses and makes a purchase selection. The SSL session protects the information transmitted over the Internet (such as card information, commands, and encryption keys) from being discovered by an unauthorized party. Other techniques for protecting a session may also be used.

In step 806 the merchant server derives a key from DES key 402 using information unique to the transaction such as the merchant identifier, the transaction identifier, or other information such as a random number. Because the payment server shares DES key 402 with the merchant server and also has access to this unique information about the transaction, the payment server will also be able to derive this same key from shared DES key 402. In this step the merchant server also creates a transaction session key (TSK) for use by the client terminal and payment server to encrypt information.

In step 808 merchant server 208 downloads an HTML page of information 406 to client terminal 204 that includes the TSK and the TSK encrypted with the derived key (ETSK). The TSK encrypted with the derived key will be used by the payment server to return an encrypted (unreadable by others) result message to the merchant server. Only the merchant server will be able to decrypt this result message and will thus be guaranteed that a successful transaction has occurred and that merchandise may be released to the user. Client terminal 204 then passes purchase request 307a including the TSK and ETSK to OPAL server 260. The purchase request may be formed as previously described in FIG. 5. Preferably purchase request 307a is also protected under an SSL session or similar.

In step 810 OPAL server 260 prepares the draw request in conjunction with emulator 266 and sends the draw request 408 encrypted with the TSK to payment server 206 along with the ETSK. In step 812 the payment server uses shared DES key 402 and the prearranged information unique to the transaction to derive the same key that the merchant server has used. Thus, the derived key can be used to decrypt the ETSK in order to produce the TSK. Once the payment server had produced the TSK, it decrypts the draw request and processes the draw request in any suitable fashion with the security card. Once the payment server has received the Debit IEP command from security card 218, it encrypts the command with the TSK. The ability to correctly derive keys and encrypt the messages authenticates the payment server as the appropriate one for the merchant server, thereby preventing value decrement by an unauthorized party.

In step 814 the payment server sends the encrypted Debit IEP command 410 to the OPAL server 260. In step 816 the OPAL server decrypts the Debit IEP command with the TSK it had received earlier from the merchant server and processes the Debit IEP command in a suitable fashion with emulator 266. Once client code module 224 has received the Debit Response message from the emulator, it encrypts this message with the TSK and sends the Debit Response message 412 to the payment server. In step 820, the payment server decrypts the Debit Response message with the TSK and processes the Debit Response message in a suitable fashion with the security card.

Once the payment server has received a Debit Result message from the security card, the payment server encrypts the Debit Result message with the TSK to form a Debit Result C message for client terminal 204. The Debit Result C message will be used by the client terminal to inform the user of a successful transaction. The payment server also generates its own confirmation message and encrypts the message with the derived key to form a Debit Result M message. The Debit Result M message will be used to inform the merchant server of a successful transaction. The payment server then sends 414 Debit Result C and Debit Result M to the OPAL server.

In step 822 the OPAL server decrypts and processes the Debit Result C message and passes the Debit Result M message 416 on to the merchant server by way of client terminal 204. Because the Debit Result M message is encrypted with ETSK, the client terminal or other entity (including the OPAL server) is not able to tamper with it. The unencrypted Debit Result C message may also be passed to the client terminal to inform the user of a successful transaction. Alternatively, the encrypted Debit Result C message may be decrypted directly by the client terminal.

In step 824 the merchant server is able to decrypt the Debit Result M message because it had originally produced the derived key from the DES key. Once the merchant server has determined that a valid Debit Result M message has been received, it confirms that a valid transaction has taken place and may release merchandise to the user. The ability to correctly derive keys and encrypt the messages authenticates the payment server as the appropriate one for the merchant server, thereby preventing value decrement by an unauthorized party.

This security embodiment of FIG. 9 may be used with any of the previously described embodiments of the invention. By way of example, this security embodiment may be used with the embodiments of FIGS. 7 and 8 in which there is only one round trip between the OPAL server and the payment server. In particular, the expected virtual card signature received from the security card may be encrypted with the derived key so that it is unreadable by the client terminal, yet the merchant server will be able to compare the received card signature with the expected card signature to validate the transaction.

Other security may also be added to a transaction. Preferably, the OPAL server resides behind a firewall and sensitive data is triple-DES encrypted. Parameter changes and signature generation is preferably handled within a hardware security module. Also, any user access is controlled through use of user identifiers and passwords. To protect against denial of service attacks, SSL is used to protect messages from the merchant or bank server to the client terminal. DES session keys protect the integrity of transactions passing between the client terminal, OPAL server and payment or load server.

Authentication and Loyalty Embodiment

Figure 16:
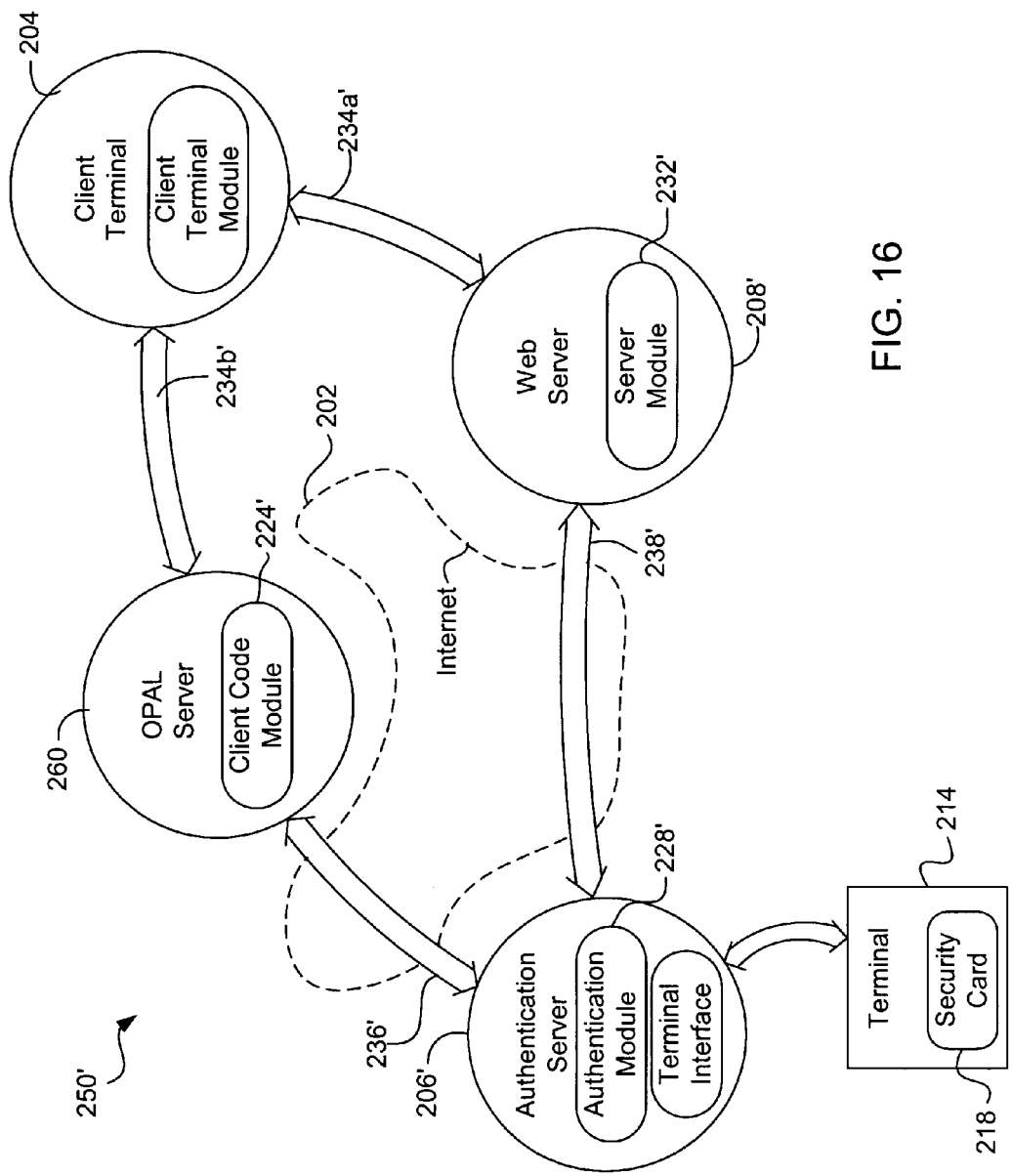
FIG. 16 illustrates a system for authentication using a virtual card according to another embodiment of the invention.

FIG. 16 illustrates a system 250' for implementing an authentication application or a loyalty application over internet 202. These applications may reside within smart card emulator 266 of OPAL server 260 along with standard accounts, stored-value, or other types of card applications. In this embodiment, OPAL server may also be termed a loyalty server.

In the authentication embodiment, a consumer may wish to access any of a variety of Web servers in order to redeem frequent flyer miles, award points, etc., that he or she has accumulated as part of a loyalty program. In this embodiment, a consumer has accumulated points through any of a variety of programs with airlines, restaurants, rental car companies, hotels, banks, credit or debit card issuers, telephone or other communication company, etc. These points are often stored with the entity that has granted them in a database indexed by a consumer name or number. For example, prior art frequent flyer cards have a number printed thereon that is used to index the number of miles accumulated by an individual in the airline's database.

Often the consumer wishes to redeem these points to receive free airline tickets, meals, car rental, overnight stays, prizes, awards, discounts, or other benefits. It is important to the airline (or other company) to be able to authenticate that the person trying to redeem points is the actual person who owns the points. By accessing a Web server associated with the particular program, this embodiment of the invention allows the consumer to use a virtual card in OPAL server 260 to authenticate that he or she is the true owner of the points and to receive benefits from the program. A consumer is typically assigned a card number (or loyalty number) that is associated with the consumer's name in a points database on the Web server. This embodiment of the invention represents the consumer's card number in a virtual card in OPAL server 260. This card number is transmitted to the Web server as part of the virtual card signature, or in a similar fashion. Thus, a consumer is authenticated to a Web server.

For example, a consumer with 30,000 frequent flyer miles on one airline may use this embodiment of the present invention to access a Web server associated with the airline. The consumer is requesting a free round-trip ticket in exchange for 20,000 miles. The present invention then operates to authenticate the consumer and delivers a confirmation of authentication message to the Web server for the airline. The Web server then deducts 20,000 miles from the consumer's account (leaving 10,000 miles) and delivers the free ticket to the consumer.

In one specific embodiment, the Web server associated with the airline (or the airline itself) keeps track of the consumer's total mileage and deducts mileage. In this instance, an authentication application in smart card emulator 266 is used to validate the presence of the consumer's virtual card in card data base 270 and to authenticate that the card number stored therein is from the true consumer. The authentication application may also be used to obtain access to the Web server site, thus authenticating the individual to whom access is given. In another specific embodiment, emulator 266 includes a loyalty application (such as on a physical smart card) and the consumer's virtual card in data base 270 stores the consumer's accumulated frequent flyer mileage; the mileage from the virtual card is then debited and confirmed to the Web server in a similar fashion as described in various of the embodiments by which a cash value is stored on and debited from a virtual card.

System 250' may be implemented in a similar fashion as system 250 of FIG. 5. The elements shown in system 250' having counterparts in system 200 are described above and have similar functionality. System 250' includes a web server 208' that may be any suitable computer server capable of presenting award information (hereinafter "benefits") to a consumer over an open network such as the Internet. Web server 208' may be the same as merchant server 208 of FIG. 5 or a separate computer. Preferably, web server 208' is implemented in a similar fashion as described above for merchant server 208. Web server 208' includes server module 232' that is preferably implemented in a similar fashion as merchant module 232. Additionally, server module 232' includes functionality to store and present benefits that are available for particular consumers. For example, benefits available such as airline tickets, prizes, etc. may be presented.

Points (such as frequent flyer miles, for example) that a consumer accumulates to achieve benefits may be linked to a particular consumer by an account number, password, or other identifier. The amount of points accumulated for each consumer may be stored on web server 208' using server module 232', or may be located in another database of the organization providing the benefits. In an alternative embodiment, these points for each program that a consumer is enrolled in are stored in a record (the consumer's virtual card) of card data base 270 and are manipulated using a loyalty application resident within emulator 266. For example, a consumer may have a virtual card that in addition to storing monetary value, also stores a quantity of frequent flyer miles accumulated for a particular airline (or a number of airlines), points accumulated for using a particular credit card, points for hotel stays at particular hotels, etc. For points stored on the consumer's virtual card in OPAL server 260, these points may be verified and debited in much the same way that monetary value on the consumer's virtual card is debited as described herein.

One embodiment by which a consumer has his or her virtual card authenticated in order to redeem points for benefits will now be explained. In one specific embodiment, a technique similar to that described in the flowchart of FIGS. 11A-11D for debiting monetary value may be used. Initially, consumer operating client terminal 204 accesses web server 208' over link 234', views benefits presented for a particular program (such as an airline's frequent flyer program), selects benefits from that program, and requests the authentication application to authenticate that his or her virtual card does in fact permit access to the services. Web server 208' receives and processes this request. The above steps may be performed in a similar fashion as steps 602 and 604.

Next, similar to step 606, web server 208' sends a page of information to client terminal 204. When claiming benefits, the total cost field is zero and the currency field is a specially assigned value. Keeping total cost field equal to zero causes the system to perform authentication but not to create a payment record. Alternatively, for those consumer's whose virtual card holds the amount of their points, additional fields may be sent from server 208' to terminal 204 indicating which account to debit and by how many points. The total cost and currency fields may be readily adapted for this purpose. The page of information is then sent to OPAL server 260 in a similar fashion as previously described.

Next, in a similar fashion to steps 608-612, a draw request message is built by OPAL server 260, and the draw request is sent to authentication server 206' over link 236'. Similar to step 614, the authentication server now processes the draw request in conjunction with security card 218 and sends back a Debit IEP command and a security card signature S2 to authentication server 206'. As total cost is zero, the draw amount state reached by security card 218 is also zero. In the alternative embodiment in which a virtual card in data base 270 stores points for a particular loyalty program, total cost may be a numerical value and a draw amount state may be reached indicating a number of points to be deducted from the virtual card.

Next, similar to steps 616-618, authentication server 206' sends the Debit IEP command and security card signature to OPAL server 260 and this information is processed. Even though a monetary value may not be debited, processing such as incrementing a counter indicating number of transactions and generating a virtual card signature S3 may still occur. In the alternative embodiment in which points are stored in card data base 270, the points needed to redeem the benefit chosen by the consumer from web server 208' may be debited from the appropriate account in this step.

Figure 11C:
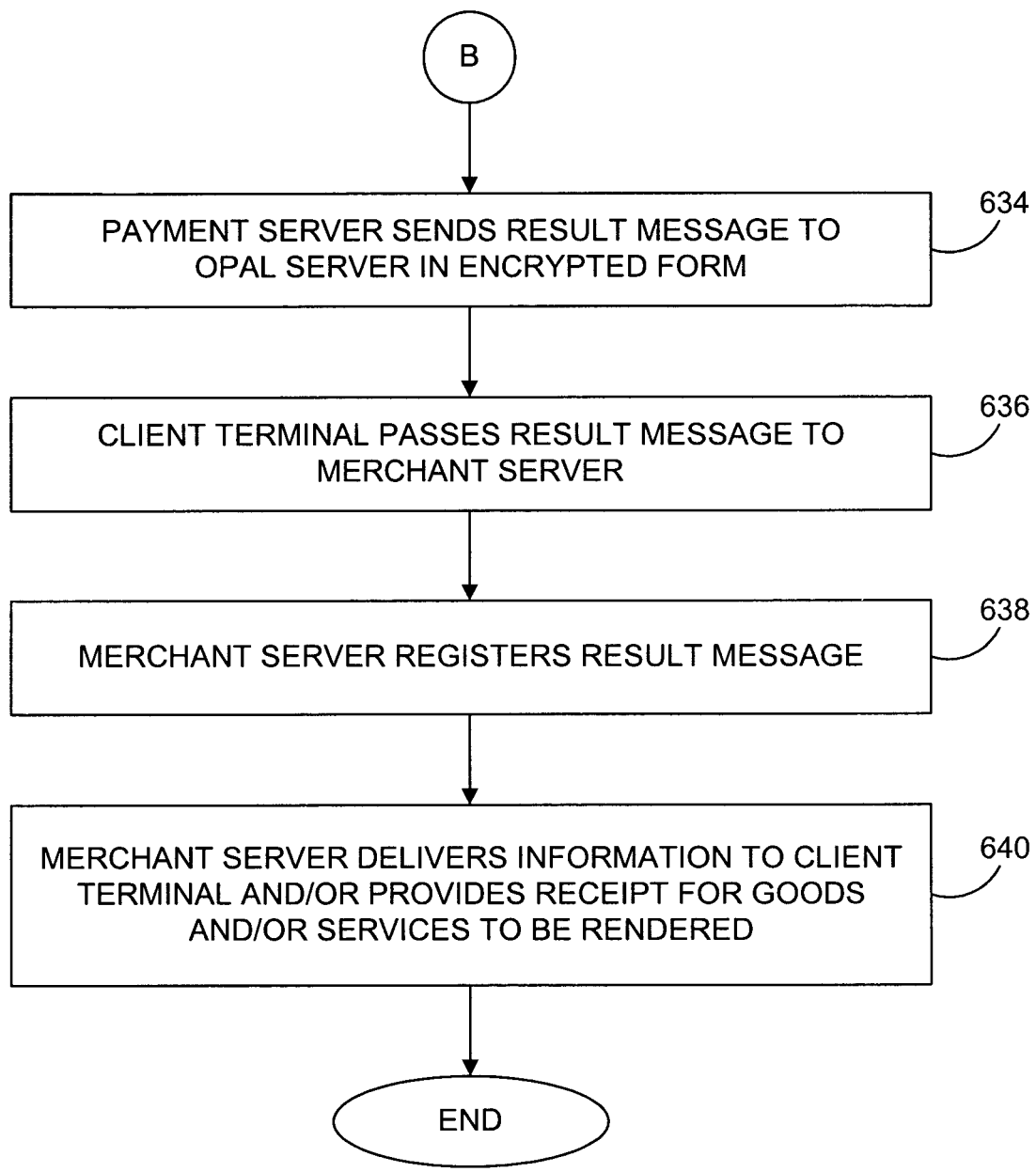

Steps 620 through 638 are performed in a similar manner as in FIGS. 11B and 11C, except that in this case a monetary transaction is not being verified, but rather the virtual card is being authenticated to allow the consumer to complete his access to services or benefits. In step 626 in particular, the signature S3 of the virtual card is verified by security card 218. In this embodiment, security card 218 would send an Authentication Result message rather than the Debit Result message of step 628. Web server 208' then debits the appropriate number of points from the consumer's account or allows access to a privileged service for the benefit requested. In the alternative embodiment in which points are stored in card data base 270, the Authentication Result message serves not only as an authentication of the consumer, but also confirmation that the correct number of points have been debited from the virtual card for the appropriate program. Next, similar to step 640, web server 208' releases the benefit requested by the consumer (such as airline tickets, prizes, discounts, etc.) and the benefit is arranged to be delivered to the consumer.

It should be appreciated that this technique of redeeming points for benefits may also be practiced using any of the alternative embodiments of FIG. 6, 7 or 8, thereby obtaining the advantages associated with those embodiments. Furthermore, this technique may take advantage of the encryption layer embodiment of FIG. 9. Additionally, as described below, the present invention may also be used to load more points onto a virtual card in much the same way that monetary value is added.

Loading Embodiment

Figure 17:
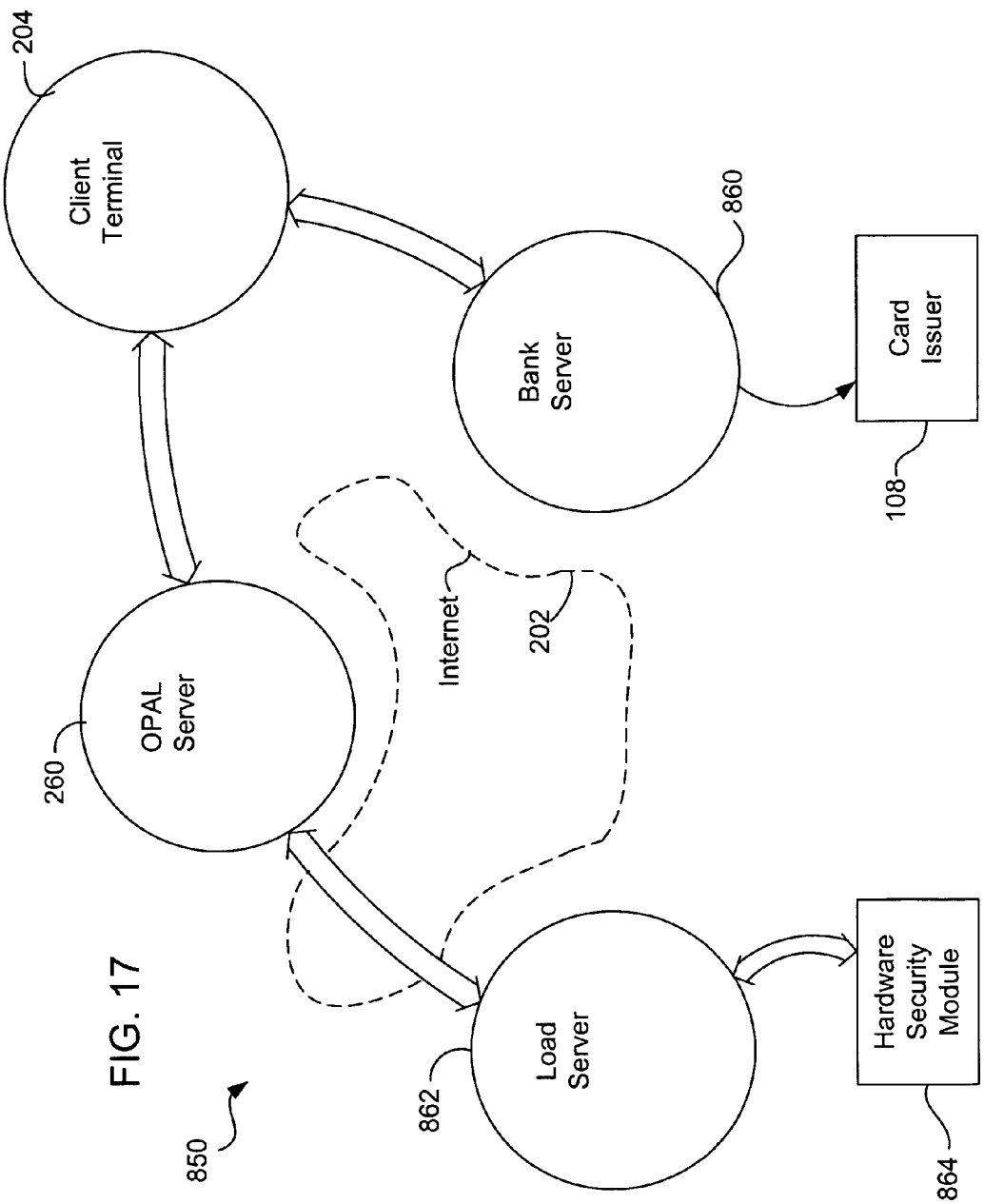
FIG. 17 illustrates a system for loading value onto a virtual card according to another embodiment of the invention.
Figure 18C:
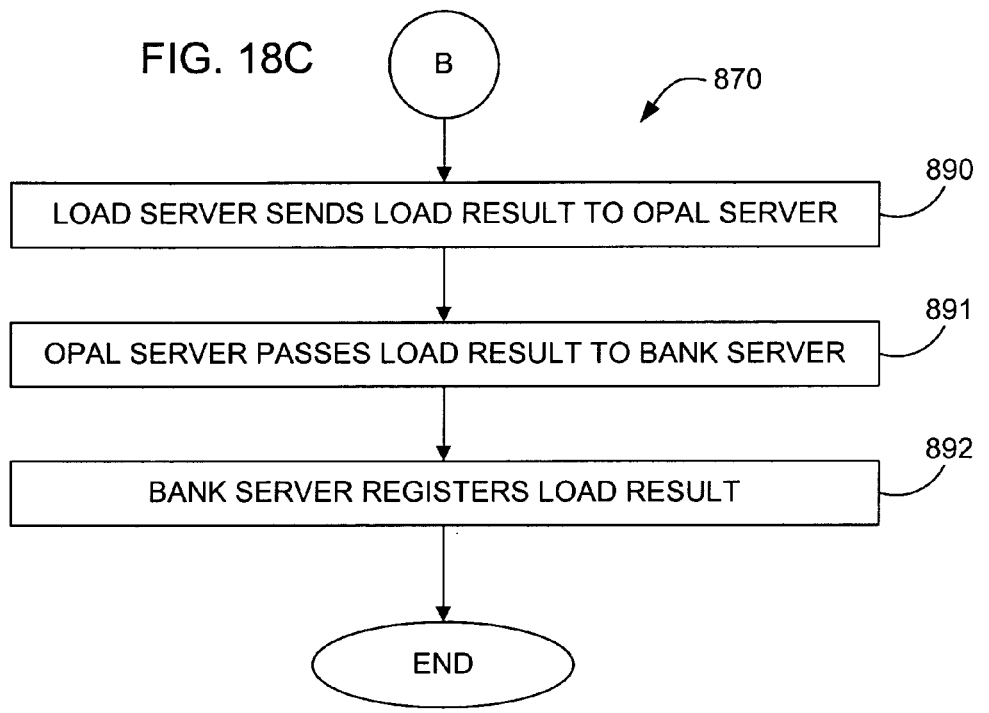
Figure 18D:
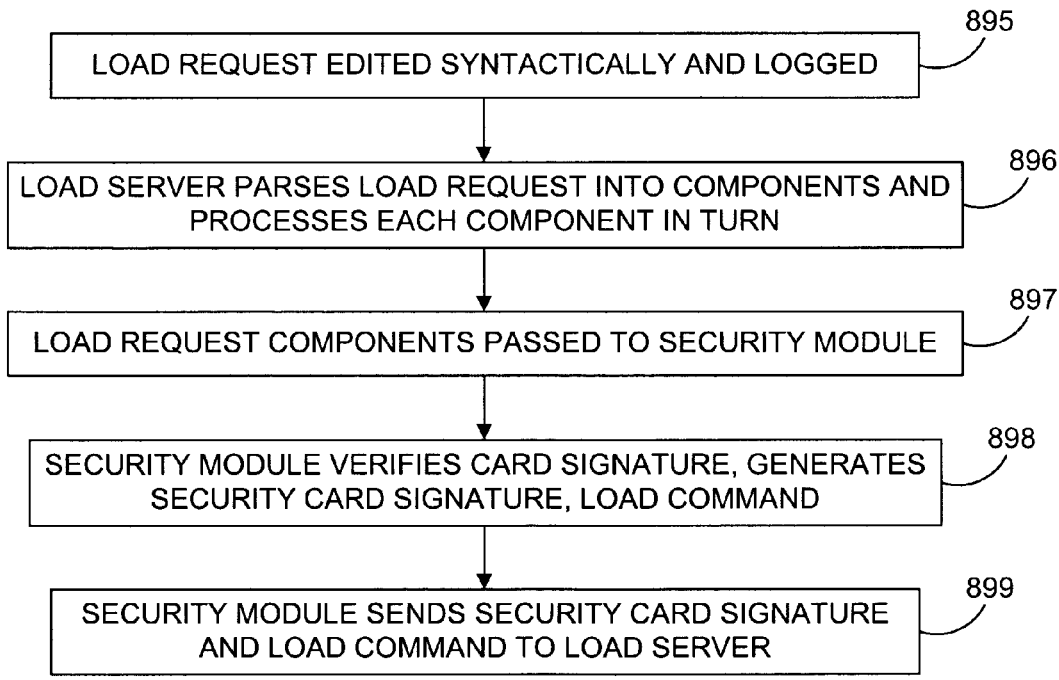

FIG. 17 illustrates a system 850 for loading value onto a virtual card according to one embodiment of the present invention. An alternative loading embodiment is discussed after the discussion of system 850. System 850 includes client terminal 204, bank server 860, OPAL server 260 and load server 862. Client terminal 204, bank server 860, load server 862 and OPAL server 260 communicate with one another over any suitable open network such as internet 202.

Preferably, each of client terminal 204, bank server 860, OPAL server 260 and load server 862 implement a code module (similar in operation to the code modules described above) in the Java programming language that provides the functionality described below. For simplicity of explanation, reference will be made below to "client terminal," "bank server," "OPAL server" and "load server" even though the resident code is performing the functions. Card issuer 108 has been described previously in FIG. 3. Card issuer 108 may be a separate financial institution from the bank that includes bank server 860, or card issuer 108 may be the same bank that includes bank server 860.

Bank server 860 is any suitable computer within a bank or other financial institution. By way of example, bank server 860 is any suitable personal computer, a workstation or a mainframe computer. In one embodiment, bank server 860 runs a "servlet" program (a Java applet running on server) for communication with client terminal 204.

Load server 862 is also any suitable computer and may be located at a third party location (such as at an issuer's site or its processor) or may be located within the same bank as bank server 860. Load server 862 also runs a servlet program for communication with OPAL server 260 and hardware security module 864. In an alternative embodiment, load server 862 and bank server 860 are the same computer which runs two different applications representing the functionality of each server.

Hardware security module (HSM) 864 is a device known in the art that may be embodied in a hardware "black box" or on any suitable computer. The hardware security module can be implemented in a hardware module outside of load server 862, can be implemented within load server 862, can be implemented in software, can be implemented as a security card described above or similar to HSM 268 above. HSM 864 contains the encryption keys used for generating signatures (for example S1, S2 and S3) that provide security for the transaction. These signatures are used by HSM 268 and HSM 864 to insure that the virtual card is not expired or counterfeit (i.e., is a valid card), to insure that module 864 is authentic, to insure that system 850 is authentic and, in general, to provide for a valid transaction and to prevent fraud. HSM 268 also includes encryption keys for the generation of a virtual card signature. In an alternative embodiment, HSM 864 could be replaced by a standard terminal that includes a security card such as is shown in the previous embodiments. In this situation, the encryption keys would be stored in the security card.

Briefly, system 850 operates as follows. A consumer accesses bank server 860 using client terminal 204. Assuming that the consumer's virtual card in OPAL server is not overloaded and that the consumer's account with the bank has sufficient funds, the consumer is able to download value from bank server 860 onto his virtual card. OPAL server 260 communicates with load server 862 to receive authorization for the load and for higher security. The virtual card may then be used to make purchases over the Internet as described above. Once the bank has downloaded value to the virtual card, a corresponding amount of funds is transferred from the bank to card issuer 108. Additionally, the same consumer account at the bank can be used to fund multiple OPAL accounts. For instance, a parent can set up their bank account to fund their child's OPAL account.

Figure 1:
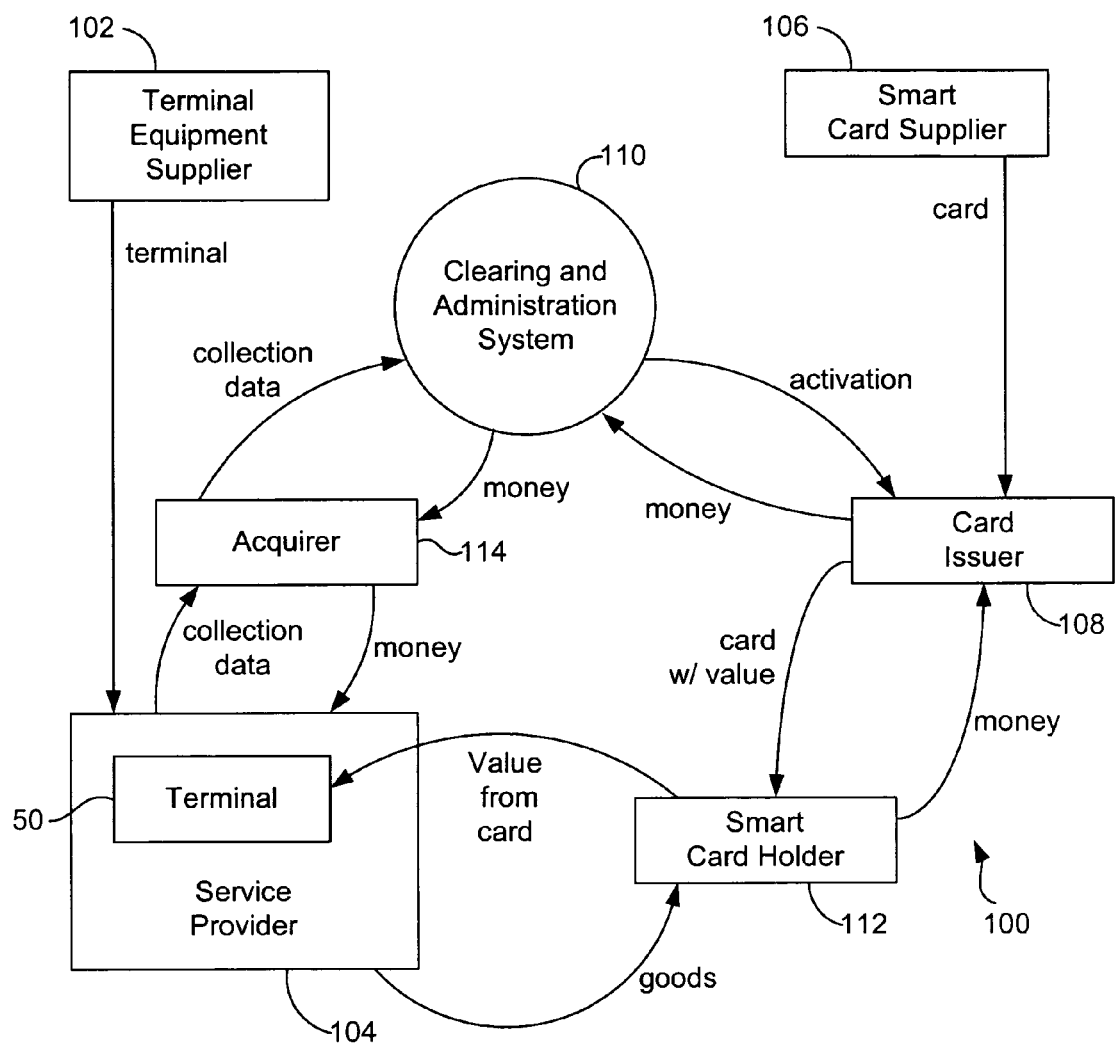
FIG. 1 is a block diagram of a prior art clearing and administration system useful for reconciling financial transactions received from a service payment terminal.

Card issuer 108 places these funds in a holding pool. Once the virtual card is used to make a purchase from a merchant, the transaction is captured and settled through a clearing and settlement service, such as system 110 described above. The issuer bank decrements the funds pool for the amount of the purchase, which is then paid to the merchant bank. The merchant bank pays the merchant for the transaction. Settlement may occur in any suitable fashion such as is known in the art and, in particular, may be implemented as previously described in FIG. 1.

Loading Embodiment Detailed Transaction Flow

One embodiment of a technique by which a virtual card is loaded over the Internet will now be described using the flowchart of FIGS. 18A through 18D with reference to FIG. 17. Various of the steps below may occur in a different order; the following description is for illustration purposes. Interaction between client terminal 204 and bank server 860, and between OPAL server 260 and load server 862, is preferably implemented in a similar fashion as between client terminal 204 and merchant server 208, and between OPAL server 260 and payment server 206 as described above, respectively. Certain implementation details mentioned above with respect to payment are equally applicable to loading a virtual card. Furthermore, the exemplary flow shown in the figures illustrates a successful transaction although a negative result may also occur.

Initially, a suitable web browser of client terminal 204 is used by the user to access a bank server Internet site. In step 871 the user selects an option to load value onto his or her virtual card in OPAL server 260. Preferably, at this point the user connects to OPAL server 260 and signs in with his user identifier (which preferably is masked on screen) and password. In step 872 the bank server sends a request for card information (including current card balance and maximum card balance). This request is passed on to OPAL server 260. OPAL server 260 via card emulator 266 reads the current virtual card balance, currency, and other card information from card data base 270 and returns the balance to bank server 860 via client terminal 204. In step 873 the bank server determines the maximum load value and verifies that enough funds are in the user's account to accommodate a load request. Preferably, maximum load value is equal to the maximum balance minus the current value of the card.

At this point a load amount screen is presented to the user. The funding account number, expiration date, the virtual card number, maximum load amount and current balance of the virtual card are displayed and the user is directed to enter the value to be loaded onto the card. The user enters the value to be loaded and confirms the amount on an acceptance screen which displays the last four digits of the funding account number and its expiration date.

Assuming that the user's account balance is adequate, the bank server requests the user's account be debited in step 874 by the load value. Advantageously, this debit request from the bank server can use the existing ATM and accounting systems of the bank to debit the user's account. From the bank's point of view, value is being transferred from the user's account much in the same way that value would be transferred to a user in the form of cash at an ATM. In this situation, though, the value is not being dispensed as cash at an ATM, but is being sent over the Internet to a virtual card.

In step 875 bank server 860 builds an HTML page that includes the following client applet parameters: the load value; the type of currency being used; the port and IP address of load server 862; a unique transaction identifier used by both the load server and the bank server to track a transaction; a unique bank identifier assigned to the bank and known to the load server; and a session key. Other information may also be included such as the currency's exponent, a status URL address of the bank server used for communication from the client terminal, and other security information to ensure the identity of the bank server and the integrity of the message. Other process-related information such as software release level, encryption methodology and keys may also be conveyed. Once this page has been built, the page is sent to the requesting client browser which passes the page on to OPAL server 260 in step 875a. Receipt of the page triggers the activation of client code module 224 (in this example a Java applet) in OPAL server 260.

In step 876 OPAL server 260 interacts with card emulator 266 to obtain card information in order to build a Load Request message for later transmission to load server 862. Once responses from the emulator are received, the OPAL server combines these responses into a byte stream suitable for transmission over a network to a load server.

Client code module 224 terminal emulates a variety of hardware security module 864 commands in order to receive responses from card emulator 266. In this embodiment, the virtual card (and the emulator) and the hardware security module are physically separated from one another; communication takes place over the Internet. In the interest of speed and reliability, it is advantageous to have only the minimum number of messages exchanged.

To operate securely and reliably in this environment client code module 224 emulates a security module and gathers all the responses for transmission into one Load Request message. The Load Request message may include a variety of information and preferably includes a virtual card signature (signature S1), a virtual card number, an expiry date, and a load amount. Other information such as the security algorithm, transaction counter, current card balance, and bank server time stamp are also preferably provided. As all of this information is prepackaged into a single Load Request message, the number of messages exchanged between OPAL server 260 and load server 862 over the Internet is minimized.

Next, in step 877 the OPAL server accesses the load server using the IP address received from the bank server. (Alternatively, if the OPAL server is also serving as the load server, then control skips this step and moves to step 879.) In step 878 the OPAL server sends the Load Request message to the load server. In step 879 the load server processes the Load Request in conjunction with an associated hardware security module (HSM) 864 as will be explained in greater detail below with reference to FIG. 18D. After step 879, the load server has received a security module signature (signature S2) as part of a Load command (also known as "Credit IEP" command) from HSM 864. The security module signature is a value that uniquely identifies and validates the HSM to prove to OPAL server 260 that the incoming Load command is a valid command from a real issuer's security module. Thus, the user of the virtual card and other interested parties are guaranteed that a valid load of the card has occurred. In a preferred embodiment of the invention, the security module signature is an encrypted value ensuring that no other entity can forge an identity of a security module.

In step 880 the load server sends the Load command including the security module signature to OPAL server 260 for loading of the virtual card. In step 881, upon receiving the Load command, client code module 224 passes the Load command to card emulator 266. Emulator 266 then processes the command in a similar fashion as it would process a Debit command described above. Emulator 266 retrieves a virtual card record from data base 270, verifies the signature using HSM 268, increases the virtual card balance by the load value, builds the transaction log, and returns the record to the data base. Emulator 266 also generates a Load Response message, a virtual card signature (signature S3), and a result code indicating success or failure of the load. In a preferred embodiment of the invention, this signature is in encrypted form to prevent tampering.

In step 882, the emulator sends the Load Response message containing the card signature (S3) and result code back to client code module 224. Next, in step 883 client code module 224 packages the Load Response message along with the card signature and sends them back to load server 862. In step 884 the load server receives the incoming message. The load server then processes the message into its components and directs the components to HSM 864. Next, in step 885 HSM 864 processes this response and verifies the received virtual card signature (S3).

As the hardware security module contains the keys and algorithms necessary to compute virtual card signatures, the security module is able to validate that a received card signature is in fact a valid one by comparing the received card signature with a generated expected value. A successful comparison indicates that a Load Response message received from the virtual card includes a valid success message and that the virtual card has been loaded. Assuming that the transaction is so far valid, in step 886 the security module sends a Load Result message (containing a confirmation) back to the load server.

It is possible that the virtual card has not been loaded by the proper amount, that the card is invalid, a user is unscrupulous or another discrepancy has occurred. For example, it is possible that OPAL server 260 has been tampered with to make it appear that a load has not occurred, when in fact a load has occurred. In this situation, processing in step 882 and on would be slightly different. For example, instead of generating a success code in the Load Response message, emulator 266 may generate a negative result code, potentially indicating that the virtual card has not been loaded. Processing of this situation would then occur as follows.

In step 882, emulator 266 sends a Load Response containing the result code and virtual card signature S3 back to client code module 224. Code module 224 recognizes a negative result code, and invokes negative result handling. Module 224 then interacts with emulator 266 to generate a new Load Request for a zero value load using elements from the original request, along with a new card signature S1.

The negative result code, along with the signatures S3 and new S1, and the zero value Load Request are passed to load server 862 for analysis. The load server determines if the transaction counter in the zero value load equals the transaction counter in the previous request, along with verifying other pertinent information such as date and time, virtual card number, and currency code and exponent. If the counters are equal, the load server will hold the original S3 and will generate a new Load Request for security module 864 using data element values that would have been expected if the original transaction had failed. The new Load Request containing the new S1 is sent to the security module. If S1 is valid, then the original negative result is true and the security module generates a response to confirm to the load server that the signature was valid (thus, the load did not take place). The original negative result from the virtual card is then released to the security module to complete the original transaction. Processing would continue, but a user account would not be debited, and no settlement need occur because the virtual card was, in fact, not loaded. If S1 is not valid, the negative response is not true and then the result code in the original request is changed to reflect a successful load and passed to the security module. Processing then continues reflecting that a load has occurred.

Returning now to further processing, in step 887 load server 862 logs the response received from HSM 864 and updates its database with the transaction identifier, the bank identifier, the load value, etc. In general, any of the plethora of information passing through the load server may be added to its database. Next, in step 890 the load server creates a Load Result message including the transaction identifier and sends this message to OPAL server 260 in encrypted form. By sending this message in encrypted form, the message may be forwarded to the bank server by way of client terminal 204 without fear of tampering. As the Load Result message is encrypted, it would be difficult for the client terminal or another entity to forge such a message and trick the bank server into thinking that a valid load had taken place.

In step 891 OPAL server 260 forwards the Load Result message via client terminal 204 to the bank server at the URL address previously received from the bank server. The client terminal may also post a message to the user informing that the load has been completed. In step 892 the bank server registers the Load Result message. The bank server calls a routine to decrypt the Load Result message. If the decrypted message is acceptable, the bank server determines a successful load has occurred. The Load Result message provides assurance to the bank that the user' card was in fact loaded with a particular value and thus prevents fraud. For example, a fraudulent user who tries to claim that his bank account was decremented and his card not loaded (and should thus receive more money from the bank) would be thwarted because the Load Result message proves that the user's card was in fact loaded. Alternatively, the Load Result message may indicate that a load did not occur, in which case the account would not be debited, and no settlement would occur.

At this point a successful load of the user's card has occurred (assuming all is well). For example, if the user had requested $100, that amount has been decremented from the user's account at the bank, and $100 has been loaded onto the user's virtual card. Preferably, at this point the amount loaded (in this example $100) is transferred from the bank to the virtual card issuer preferably through an existing network. The $100 is transferred so that the card issuer may manage the float on these unspent funds until the user spends the $100. Once the $100 (or a smaller portion) has been spent with a merchant, the card issuer is then able to settle the transaction with the merchant using any suitable clearing and settlement system. In an alternative embodiment, the bank may retain the $100 and settle directly with the merchant. In another embodiment, the bank and the card issuer are the same financial institution, and the $100 may be shifted between parts of the organization or remain in place.

Returning now to a more detailed discussion of step 879, FIG. 11D describes a technique for processing a Load Request message in conjunction with a security module. Once the Load Request message is received by the load server, the load server parses it into the appropriate elements and passes a request to the security module as will be explained below. Alternatively, the load server can build a network message and switch the request to a remote authentication server. Or, a smart terminal could parse the message and pass responses to the security module.

In step 895 the load server edits the Load Request for syntactic correctness and logs the request as received. In step 896 the load server constructs a Load Request message. In step 897 the load server passes the Load Request to the security module to emulate a card interacting with the security module. The load server behaves as if a physical card were actually interacting in an ATM (for example) through a network to a host with a security module. In this fashion, the Load Request originating from OPAL server 260 has been sent in prepackaged form over the Internet, thus emulating a traditional interaction between a physical card and a security module.

In step 898, the security module verifies the received virtual card signature S1 to prevent fraud. The security module generates its security module signature S2 and the Load command. The signature S2 will confirm to OPAL server 260 that the security module is authentic and belongs to the issuer of the virtual card. Additionally, S2 protects against a user trying to perform a fake load, keys out of synchronization, a counterfeit card, an expired card, etc. The security module then sends the signature and Load command to the load server as indicated in step 899. At this point, step 879 ends and control returns to step 880.

Alternative Loading Embodiment

In an alternative embodiment, the load server functionality is incorporated into OPAL server 260. This embodiment allows an issuer to use the OPAL server as his authentication center. In this embodiment, the functionality of HSM 864 of load server 862 is incorporated into HSM 268 so that only one HSM is needed. Alternatively, two HSM's may be used. When the two servers are resident in the same hardware, message encryption is preferably deactivated to further increase throughput.

In a first step, the user accesses the bank server web site. The web site displays an option to load value onto his or her virtual smart card. The user chooses this option and is prompted to log in by entering his user identifier (which preferably is masked on screen) and password. This information is sent to OPAL server 260 (preferably in an SSL encryption session) which verifies the user data. OPAL server 260 then sends back to the bank server the user's current virtual card balance (including currency type and exponent), maximum balance and maximum load amount. Bank server 860 then displays to the user a menu of load amounts or allows the user to enter an amount. The user selects a load amount and submits the request. In a preferred embodiment, the user is prompted locally by client terminal module 290 resident on client terminal 204 to confirm the amount to load. A display screen displays the last four digits of the funding account number and expiration date. Once the user approves, client terminal module 290 sends the load amount to OPAL server 260.

Next, OPAL server 260 routes a funds authorization request to a payment gateway which routes the request to the issuer of the virtual card via a network. A payment gateway may be implemented as an existing network endpoint that switches messages between networks (like those networks of Visa and American Express)—it performs message reformatting and protocol conversion as necessary. In a preferred embodiment, the request is routed over VisaNet, an existing global clearing and settlement system. Once approved, the payment gateway routes the approval response back to OPAL server 260.

Next, OPAL server 260 processes the load authentication internally, generating and verifying signatures S1, S2 and S3 in a similar fashion as described above. For example, if two HSMs are in use, HSM 268 represents the virtual smart card and HSM 864 represents the issuer. Smart card emulator 266 would then pass signatures generated by HSM 268 to HSM 864 and vice-versa. Should only one HSM be in use, HSM 268 would include not only cryptographic keys normally held within OPAL server, but also the issuer keys normally held within HSM 864. (Alternatively, HSM 268 may hold only a master key, while all other keys are passed from an encrypted database.) In this scenario, smart card emulator 266 would receive signature S1 (for example) from HSM 268, and then turn around and send signature S1 back to HSM 268 for verification (HSM 268 then acting as if it were HSM 864). Generations and verification of signatures S2 and S3 may be performed in a similar fashion.

Once successful, OPAL server 260 sends a confirmation message to client terminal 204 advising the user of the new amount loaded onto his virtual card. OPAL server 260 then may send a clearing request message to the issuer via the payment gateway. The payment gateway processes and responds. Finally, OPAL server 260 sends a load advise message to clearing and settlement system via the Payment Gateway.

Computer System Embodiment

Figure 19:
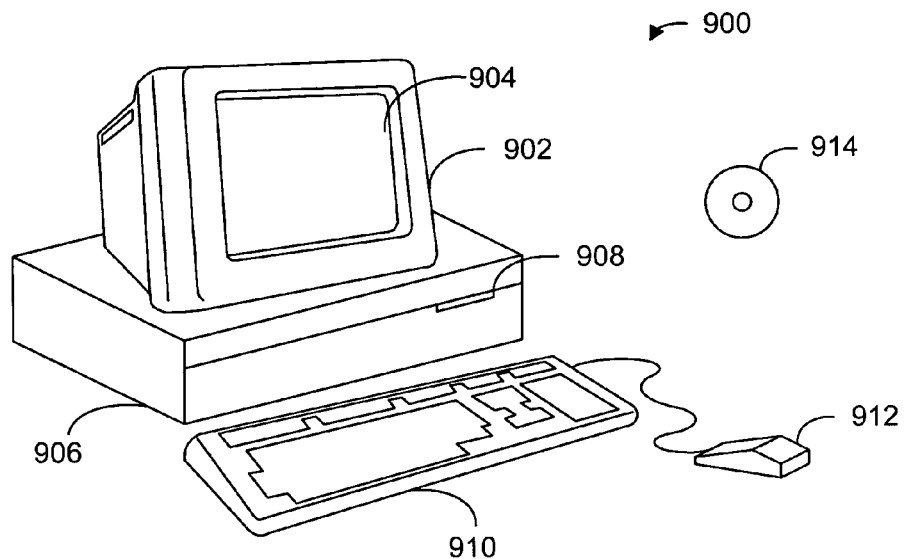
FIGS. 19 and 20 illustrate a computer system 900 suitable for implementing embodiments of the invention.
Figure 20:
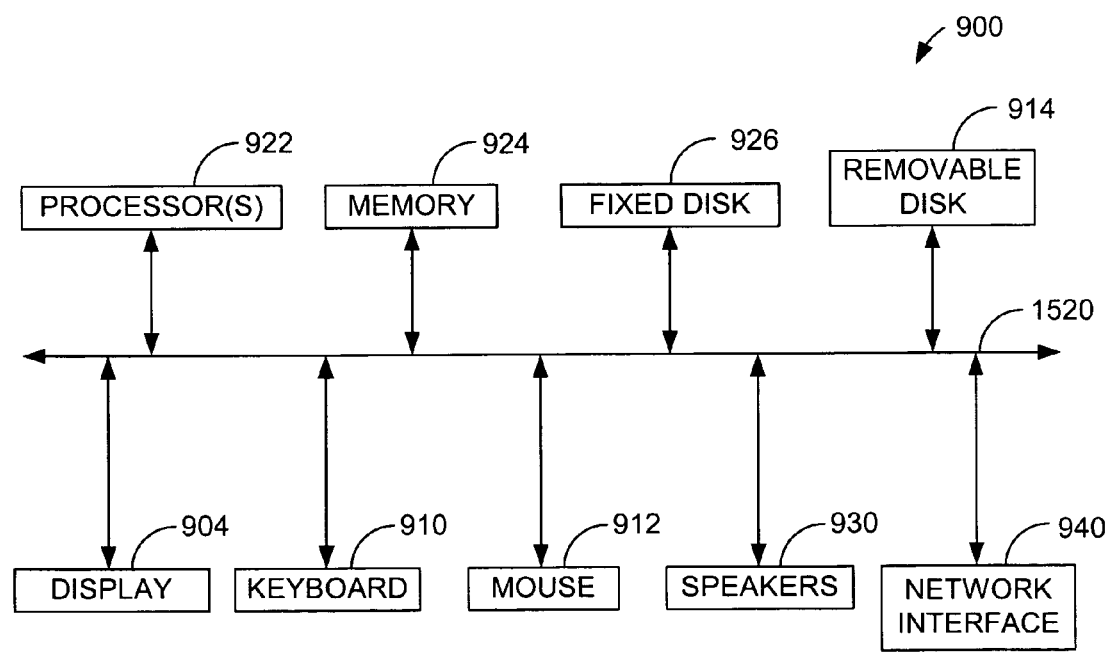

FIGS. 19 and 20 illustrate a computer system 900 suitable for implementing embodiments of the present invention. FIG. 19 shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 20 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magnetooptical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, multiple issuers or multiple currencies may be represented on a single OPAL server. Also, the user identifier may be routed to the issuing bank for verification, instead of by the OPAL server. The virtual card database may be resident within the OPAL server or on separate hardware. The SET protocol may also be used at a future time.

In addition, other arrangements or databases for representing a virtual card that are capable of loading, storing and decrementing value on command may be used. Also, any network capable of performing routing functionality between a client terminal, an OPAL server, a load and a bank server may be used. Furthermore, the security module may be a physically separate module, a card located in a terminal attached to a load server, or its functionality may be incorporated directly into a load server in hardware or software. And although the client terminal may be used to route messages between the bank server and load server, both of these servers may also communicate directly between themselves, and may even be the same computer. The specific messages shown passing between the computers are exemplary, and other types of messages may be used. A specified Load Request is shown, but other information may also be loaded onto a virtual card using a security module emulation and then sent packaged as one message to the security module over a network. In addition to monetary value, other types of value such as electronic cash, checks, awards, loyalty points, benefits, etc., may be loaded onto a card, and the term "value" is intended to broadly cover all of these various types. Any suitable type of encryption may be used to encrypt messages passing between the computers.

Therefore, the described embodiments should be taken as illustrative and not restrictive, and the invention should not be limited to the details given herein but should be defined by the following claims and their full scope of equivalents.

We claim:

1. An on-line purchase and load (OPAL) server computer for performing a purchase transaction over a network using a virtual smart card, said OPAL server computer comprising:
    a virtual smart card database having a plurality of records, each record including a virtual smart card identifier and a monetary balance corresponding to a single virtual smart card;
    a hardware security module arranged to decrypt said monetary balance, to decrease said monetary balance, and to encrypt said decreased monetary balance;
    a smart card emulator that receives smart card commands from a pseudo card reader module and processes said commands in conjunction with said virtual smart card database and said hardware security module, said smart card emulator arranged to retrieve one of said records from said virtual smart card database, and to deliver said monetary balance to said hardware security module and to store said encrypted decreased monetary balance received from said hardware security module in said retrieved record; and
    said pseudo card reader module that receives said smart card commands related to said purchase transaction over said network and relays said commands to said smart card emulator, whereby said OPAL server computer performs said purchase transaction over said network using one of said records in said virtual smart card database.

2. An OPAL server computer as recited in claim 1 wherein said virtual smart card database further includes purchase algorithm identifiers, wherein said hardware security module includes a plurality of purchase algorithms that are identified for use by one of said purchase algorithm identifiers, and wherein said hardware security module is arranged to decrypt said monetary balance using one of said purchase algorithms identified by one of said purchase algorithm identifiers.

3. An OPAL server computer as recited in claim 1 further comprising:
    a user verification module that verifies a user accessing said OPAL server computer and generates a user identifier, said user identifier being suitable to identify one of said virtual smart card records in said virtual smart card database.

4. An OPAL server computer as recited in claim 1 wherein said smart card emulator and said pseudo card reader module are implemented as a single software module.

5. An OPAL server computer as recited in claim 1 wherein said network is an internet over which said OPAL server computer communicates with a merchant server and a payment server to transact said purchase transaction.

6. An OPAL server computer as recited in claim 1 wherein said network is an internet over which said OPAL server computer communicates with a bank server and a load server to load value onto said virtual smart card.

7. An OPAL server computer as recited in claim 1 wherein said network is an internet over which said OPAL server computer communicates with a web server and an authentication server to authenticate a user.

8. An OPAL server computer as recited in claim 1 wherein said OPAL server computer communicates over said network with a payment gateway for funding account authorization and clearing.

9. An OPAL server computer as recited in claim 1 wherein said smart card emulator is suitable for returning said record to said virtual smart card database.

10. An OPAL server computer as recited in claim 1 wherein each record of the virtual smart card database also includes a funding account number wherein the funding account number identifies an account that contains a monetary amount that can be loaded onto a virtual smart card.

11. An OPAL server computer as recited in claim 1 wherein the OPAL server is further configured to receive a purchase request message from a client terminal, wherein the purchase request message indicates a good or service to be purchased by a user, a user identifier, and a user password.

12. An OPAL server computer as recited in claim 11 wherein the OPAL server is further configured to send a draw request message to a payment server, wherein the draw request message indicates an amount of money required to purchase the good or service and a merchant identifier.

13. An OPAL server computer as recited in claim 12 wherein the OPAL server computer is further configured to receive a debit command from the payment server, wherein the debit command indicates an amount of money to debit from a respective virtual smart card.

14. An OPAL server computer as recited in claim 13 wherein the smart card emulator is configured to debit itself in response to the debit command by the amount of money indicated in the debit command.

15. An OPAL server computer as recited in claim 13 wherein the OPAL server computer is further configured to send a debit response message to the client terminal, wherein the debit response message informs the user either that the amount of money has been debited from the smart card emulator or that money has not been debited from the smart card emulator due to a lack of sufficient funds.

16. An OPAL server computer as recited in claim 1 further comprising: a memory arranged to store said virtual smart card database, said smart card emulator, and said pseudo card reader module.

17. An OPAL server computer as recited in claim 1 wherein said hardware security module is a hardware device in said OPAL server computer.

18. An OPAL server computer as recited in claim 1 wherein said hardware security module is a security box attachable to said OPAL server computer.

19. An on-line purchase and load (OPAL) server computer for performing a load transaction over a network using a virtual smart card, said OPAL server computer comprising:
  a virtual smart card database having a plurality of records, each record including a virtual smart card identifier and a monetary balance corresponding to a single virtual smart card;
  a hardware security module arranged to decrypt said monetary balance, to increase said monetary balance, and to encrypt said increased monetary balance;
  a smart card emulator that receives smart card commands and processes said commands in conjunction with said virtual smart card database and said hardware security module, the smart card emulator also configured to send a load request message to a load server, wherein the load request message indicates a virtual smart card identifier and a load amount for a respective virtual smart card, the load amount indicating an amount of money to load onto the respective virtual smart card, said smart card emulator arranged to retrieve one of said records from said virtual smart card database and to deliver said monetary balance to said hardware security module and to store said encrypted increased monetary balance received from said hardware security module in said retrieved record; and
  a pseudo card reader module that receives said smart card commands related to said load transaction over said network and relays said commands to said smart card emulator, whereby said OPAL server performs said load transaction over said network using one of said records in said virtual smart card database.

20. An OPAL server computer as recited in claim 19 wherein the OPAL server is configured to receive a load command from a load server wherein the amount of money indicated in the load request message is loaded onto the respective virtual smart card.

21. An OPAL server computer as recited in claim 20 wherein the smart card emulator is configured to send a load response message to a client terminal, wherein the load response message informs a user that the amount of money has been loaded onto the respective virtual smart card.

22. An OPAL server computer as recited in claim 19 further comprising:
  a memory arranged to store said virtual smart card database, said smart card emulator, and said pseudo card reader module.

23. An OPAL server computer as recited in claim 19 wherein said hardware security module is a hardware device in said OPAL server computer.

24. An OPAL server computer as recited in claim 19 wherein said hardware security module is a security box attachable to said OPAL server computer.

* * * * *